(12) United States Patent  (10) Patent No.: US 9,015,336 B2
Lassila et al.  (45) Date of Patent: Apr. 21, 2015

(54) CONVERGENT MEDIATION SYSTEM WITH IMPROVED DATA TRANSFER

(75) Inventors: Jussi Lassila, Espoo (FI); Mika Tanttu, Helsinki (FI)

(73) Assignee: Comptel Corporation, Helsinki (FI)

(*) Notice: Subject to any disclaimer, the term of this patent is extended or adjusted under 35 U.S.C. 154(b) by 434 days.

(21) Appl. No.: 12/864,459

(22) PCT Filed: Jan. 19, 2009

(86) PCT No.: PCT/FI2009/050044
§ 371 (c)(1),
(2), (4) Date: Sep. 28, 2010

(87) PCT Pub. No.: WO2009/092853
PCT Pub. Date: Jul. 30, 2009

(65) Prior Publication Data
US 2011/0010461 A1    Jan. 13, 2011

Related U.S. Application Data

(60) Provisional application No. 61/006,639, filed on Jan. 24, 2008.

(30) Foreign Application Priority Data

Jan. 23, 2008  (EP) .................................... 08150558

(51) Int. Cl.
*G06F 15/16*  (2006.01)
*H04L 12/14*  (2006.01)

(52) U.S. Cl.
CPC ............ *H04L 12/14* (2013.01); *H04L 12/1403* (2013.01)

(58) Field of Classification Search
CPC ..... H04L 12/14; H04L 12/1403; H04L 12/56; H04L 12/5693

USPC .......................................................... 709/242
See application file for complete search history.

(56) References Cited

U.S. PATENT DOCUMENTS 5,904,733 A    5/1999  Jayakumar
6,449,618 B1   9/2002  Blott et al.
(Continued)

FOREIGN PATENT DOCUMENTS

EP    0927932    7/1999
EP    1471428    10/2004
(Continued)

OTHER PUBLICATIONS

International Search Report for Application No. PCT/FI2009/050044 (5 pages).
(Continued)

*Primary Examiner* — Tauqir Hussain
*Assistant Examiner* — Angela Widhalm
(74) *Attorney, Agent, or Firm* — Faegre Baker Daniels LLP

(57) ABSTRACT

An object is to create a convergent mediation system (10) and method that meet the technical requirements of low latency time and high reliability. According an aspect of the invention, these objects are achieved by providing a convergent mediation system (10) that comprises a plurality of independent processing nodes (120, 125) adapted to form processing streams (200) for the online processing (12) and off-line processing (14) of data. Each of the processing streams (200) comprises at least two independent nodes (120, 125) in sequence and buffers (145) between the nodes (120, 125). Furthermore, random access memory is utilized such that at least one of the buffers (145) in each of the online processing streams (212) is formed by a dedicated memory area in the random access memory.

23 Claims, 21 Drawing Sheets

(56) References Cited

U.S. PATENT DOCUMENTS

| | | |
|---|---|---|
| 6,766,368 B1 | 7/2004 | Jakobson et al. |
| 6,795,399 B1 * | 9/2004 | Benmohamed et al. ...... 370/235 |
| 7,437,765 B2 | 10/2008 | Elms et al. |
| 7,460,473 B1 * | 12/2008 | Kodama et al. ............ 370/230 |
| 7,525,902 B2 | 4/2009 | Dominic |
| 7,610,371 B2 | 10/2009 | Enqvist |
| 7,860,762 B2 | 12/2010 | Yi et al. |
| 7,984,336 B2 * | 7/2011 | Deleris ..................... 714/45 |
| 8,042,106 B2 | 10/2011 | Talja |
| 8,051,165 B2 | 11/2011 | Enqvist |
| 8,224,965 B2 * | 7/2012 | Bos et al. .................. 709/227 |
| 8,228,791 B2 * | 7/2012 | Bugenhagen et al. ........ 370/230 |
| 8,244,932 B2 * | 8/2012 | Amini et al. ................ 709/231 |
| 2001/0001268 A1 | 5/2001 | Menon |
| 2002/0052754 A1 * | 5/2002 | Joyce et al. ................... 705/1 |
| 2002/0138559 A1 | 9/2002 | Ulrich |
| 2002/0194371 A1 * | 12/2002 | Kadoi .......................... 709/239 |
| 2003/0009443 A1 | 1/2003 | Yatviskiy |
| 2004/0240648 A1 * | 12/2004 | Lilge et al. ............. 379/114.28 |
| 2005/0100149 A1 * | 5/2005 | Abbasi et al. ............ 379/114.2 |
| 2005/0177670 A1 | 8/2005 | Fujimoto et al. |
| 2006/0045250 A1 | 3/2006 | Cai et al. |
| 2007/0016907 A1 * | 1/2007 | Benedetti et al. ............. 718/104 |
| 2007/0180453 A1 | 8/2007 | Burr et al. |
| 2007/0242816 A1 * | 10/2007 | Cai et al. .................. 379/127.05 |
| 2008/0028081 A1 | 1/2008 | Bruss |
| 2009/0030943 A1 | 1/2009 | Kall |
| 2009/0215411 A1 * | 8/2009 | Tucker et al. ............... 455/90.2 |
| 2011/0010457 A1 | 1/2011 | Tanttu et al. |
| 2011/0010581 A1 | 1/2011 | Tanttu et al. |

FOREIGN PATENT DOCUMENTS

| | | |
|---|---|---|
| EP | 1517469 | 3/2005 |
| EP | 1761021 | 7/2007 |
| WO | WO 02/059754 | 8/2002 |
| WO | WO 02/103571 | 12/2002 |
| WO | WO 03/025809 | 3/2003 |
| WO | WO 2004/095326 | 11/2004 |
| WO | WO 2005/027409 | 3/2005 |
| WO | WO 2006/131588 | 12/2006 |
| WO | WO 2007/020499 | 2/2007 |
| WO | WO 2007/002577 | 4/2007 |
| WO | WO -2007/120598 | 10/2007 |

OTHER PUBLICATIONS

Bormann et al.: "Covergent online Charging for Context-Aware Mobile Services", AINAW '07 $21^{st}$ International Conference on Advanced Information Networking and Applications Workshops, 2007.

European Search Report and Examination Report for EP 08150558.8 issued by the European Patent Office (6 pages).

Chandra et al., "Dynamic Resource Allocation for Shared Data Centers Using Online Measurements," Lecture Notes in Computer Science, Springer Verlag, Berlin, DE, vol. 2707/2003, Jun. 2, 2003, pp. 381-398.

Abbleby K. et al., "Oceano-SLA Based management of a Computing Utility", IEEE/IFIP International Symposium on Integrated Networkingmanagement Proceedings, May 14, 2001, pp. 885-868.

Wimmer et al. "Trends in Electronic Government: Managing Distributed Knowledge", Sep. 4, 2000, pp. 340-345, XP010515518, IEEE Expert 1098/8068/01.

Delic, K A et al. "Towards an Architecture for Real-Time Decision Support Systems: Challenges and Solutions", Jul. 2001, pp. 303-311, IEEE Expert 1098/8068/01.

Hausheer D. et al., "Design of a Distributed P2P-Based Content Management Middleware", Sep. 1, 2003, pp. 173-180, XP010657599, Euromicro Conference, 2003; Piscataway, NJ.

Openet Telecom; "Network-Edge Intelligence FusionWorks/ Mediation v4.1 Online!", Feb. 2005, p. 1, also available at www.openet.com/nlte_05.02.08.02.

Wiederhold, Gio, et al. "The Conceptual Basis for Mediation Services Cooperative Information Systems", Sep./Oct. 1997, pp. 38-47, IEEE Expert, 0885-9000197.

Wiederhold, Gio, "Mediations in the Architecture of Future Information Systems", Mar. 1992, pp. 38-49, IEEE Expert 008-916292/0300.

\* cited by examiner

CONVERGENT MEDIATION SYSTEM WITH IMPROVED DATA TRANSFER

CROSS REFERENCE TO RELATED APPLICATION

This application is a U.S. National Stage patent application of PCT/FI2009/050044, which designated the United States, filed Jan. 19, 2009 which claims priority to European Patent Application No. 08150558.8, filed Jan. 23, 2008, and U.S. Provisional Patent Application Ser. No. 61/006,639, filed Jan. 24, 2008, the entire disclosures of which are hereby expressly incorporated by reference herein.

TECHNICAL FIELD

The present invention relates to convergent mediation systems.

Convergent mediation systems are computer systems operating between a source system and a target system. A typical example of the source system is a telecommunications network and a typical target system is an OSS/BSS (Operations Support System/Business Support System) system of a telecom operator.

The present invention relates particularly to a method, system and computer program product of mediating data records made in communication networks. The present invention is especially suitable for billing and charging calls and services used in communication networks. The billing and charging can be done simultaneously for both pre-paid and post-paid methods. The term convergent mediation specifically refers to the applicability of the method and system for both pre-paid and post-paid charging.

The increasing demand for tailored life style services in the telecom domain is changing the service landscape. Telecom service providers must rethink their offering to create a service palette that their subscribers can control and manage in real time. As a vital link in the supply chain for these services, Operations Support Systems (OSS) must also be flexible and convergent. The main driver for convergence comes naturally from the need to maximise the business potential by the implementation of service and payment convergence, that is, unifying the service offering to all subscribers independently of the payment type (prepaid or postpaid).

In order to achieve service and payment convergence, service providers have to face and solve many technical challenges. Firstly, there is the challenge of network convergence; new networks being implemented along side of the old ones. Service providers' infrastructure very often comprises different vendors' equipment and various protocols, creating challenges of vendor and technology convergence, that is, the need to integrate with different protocols, standards and several vendors' equipment. With service and payment convergence, an increasing number of service providers are also facing the challenge of billing system convergence; the challenge of handling all services, payment and account types, and rating of services with their often complicated system setups.

Thus, one of the technical challenges is the requirement to provide low latency time for prepaid processing.

Another challenge is the reliability of the convergent mediation system: No data should be lost even in error situations.

The above-mentioned two challenges set contrary requirements to the convergent mediation system and therefore constitute a real technical problem. An extremely reliable system appears to be slow such that the latency time is unacceptable. And vice versa, streamlining the data handling processes to shorten the latency time of the system tends to weaken the reliability.

BACKGROUND ART

The prior art discloses several convergent mediation solutions that can meet the above challenges with varying degrees of success.

Convergent mediation solutions in the market are typically real-time collection based systems that are integrated with legacy pre-paid systems. These 'convergent solutions' are mainly a collection of different sets of known devices and systems. An example of such a system is described in FIG. 1.

Traditional off-line mediation, also called as billing mediation, solution contains functionalities like collection of usage data from network elements, aggregation, conversion of data format to unified format, correlation, etc. This all has been ready for years and most likely will be used for years to come.

On the other hand, online mediation solutions are used, for example for charging the non-voice services of prepaid customers, executing charging for a multimedia session between a mobile terminal and a remote host on both an application/media level and on an IP/access bearer level, and for minimizing credit losses caused by subscribers, while at the same time maintaining good performance of the system.

Also the traditional IN-based Prepaid Systems have been designed for charging the voice calls of prepaid customers. Already today prepaid subscribers form the majority of the total worldwide customer base and they want to be able to use the same services as the postpaid users. Until now, the lack of open, real-time charging solution has been slowing down the service deployment for prepaid subscribers.

In a preferred online mediation solution an end user session management, especially for charging, is required. In most of the prior art systems, operations requiring faster end user session charging cannot be performed, and operations desiring faster end user charging are performed inconveniently. An example of operations that require faster end user session charging is online service offered to an unknown subscriber. An example of an operation that is performed inconveniently is one where subscriber has to give one's credit card number to unreliable host for charging Internet purchases.

Patent application publication WO 2004/095326 discloses a real-time and continuous off-line mediation method for event records generated by telecommunications network.

Patent application publication WO 2005/027409 discloses an online charging method in communications network.

Patent application publication EP 1761021 A1 discloses one kind of convergent pre- and post-paid billing architecture. The principle idea of EP 1761021 is that pre- and post-paid billing systems are combined together with rating and customer management facilities.

Patent application publication WO 2007/020499 discloses an online charging management server used with account management system. These kinds of solutions are also determined by different standardisation organisations like 3GPP, ETSI, etc.

Patent application publication WO 2007/002577 discloses a converged off-line and converged online charging systems with a common rating and charging gateway function.

DISCLOSURE OF INVENTION

It is an object of the present invention to create a new convergent mediation system and method that solve the technical problem of providing both reliability and low latency time for data processing.

According to an aspect of the invention, these objects are achieved by providing a convergent mediation system that comprises a plurality of independent processing nodes adapted to form processing streams for the online processing and off-line processing of data. Each of the processing streams comprises at least two independent nodes in sequence and buffers between the nodes. Furthermore, random access memory is utilized such that at least one of the buffers in each of the online processing streams is formed by a dedicated memory area in the random access memory.

According to another aspects of the invention, there is provided a convergent mediation method, wherein the data processing in an online processing stream includes passing data from a preceding node in the steam to the succeeding node in the steam via said buffer formed by the dedicated memory area in the random access memory.

According to the present invention, there is also provided a computer program product for running a mediation system in accordance with the above-described method.

The present invention makes it possible to construct a convergent mediation system that can simultaneously provide a low latency time and very good reliability of online processing. Division of the mediation process into a plurality of part processes in independent processing nodes contributes to both reliability and processing speed. This is because the possible errors are localized to particular independent part processes in the respective nodes. At the same time, the system is scalable as the number of independent processing nodes can be increased in order to meet increasing processing load, for instance. Furthermore, even the possible problems caused by such localized error points are minimized by means of buffering the data between the processing nodes using a low latency buffering mechanism utilizing random access memory.

The inventive concept allows also several useful and advantageous embodiments, which provide further advantages.

For example, it is possible to provide all of said independent processing nodes on a single platform such that both online processing and off-line processing is performed on one common platform. In such an embodiment, the processing power of the platform can be allocated to the respective processes according to their needs such that the system can offer both a low latency time for online processing and a high throughput for off-line processing. Furthermore, the common-platform embodiment provides the above benefits without compromising interoperability and ease of administration of the system. Indeed, the prior are problems with interoperability and administration of the system can be alleviated by these embodiments as there is only one platform for both of said processing types. Consequently, there is not anymore need to administrate two or more different processing platforms and try to guarantee their interoperation.

An embodiment of the invention providing a node manager that can start up new nodes, when required, offers scalability to the mediation system.

Invention offers also embodiments that can be operated continuously once started, because all of the configurations can be made while the system is on production.

The invention allows even such embodiments that overcome all the challenges of different types of billing, charging and payment convergence. These embodiments help the service providers to differentiate in highly competitive markets by offering smooth evolution of the current networks—and BSS/OSS—environments into a fully convergent solution, with the best-of-breed components for convergent mediation solutions.

Furthermore, there are embodiments that are designed for rapid deployment and fast adaptation to new demands. These embodiments enable service providers to launch new and exciting services to the market fast while assuring accurate charging. These embodiments provide reliable usage collection and charging that ensure that the subscribers can be satisfied with the accuracy of their bills or their credit management. A system according to the embodiments is scalable and works equally well irrespective of whether the service provider has 10 000 or 100 million subscribers.

According to embodiments, a further advantage is that the mediations system may play a pivotal role both in revenue assurance and in fraud detection. These embodiments can ensure that all usage data is collected and charged online accurately, which is fundamental to a mobile service provider's revenue generation. Online capabilities are required to close the revenue leakage that is caused by, e.g. hot billing based solutions. There are also embodiments with provisioning capabilities that help also reduce fraud, especially in a prepaid environment, thus reducing service provider losses. As mobile services and technologies evolve, so too should charging models be tailored to a diversifying range of individual needs. There are also embodiments that meet new requirements, for example in the migration path to 3G, 4G, Universal Mobile Telecommunications System (UMTS), Wireless Local Area Network (WLAN), Terrestrial Trunked Radio (TETRA), IP Multimedia Subsystem (IMS), Voice over IP (VoIP), IP group calls, Push-To-Talk (PTT), content service sessions, multiplayer interactive game sessions, etc.

According to an embodiment of the invention, the convergent mediation is processed within a truly one platform. Any distinct processing platforms or devices are not needed. An advantage of this embodiment is that operators' need not to process and support several different billing and charging platforms that may be very difficult to adapt together. Today's convergent platforms in the market are integrated collections of existing billing, legacy prepaid and account management systems. Typically convergent mediation solution in the market can handle network convergence by supporting multiple access networks (e.g. mobile, fixed and broadband) and related services but does not support payment convergence (e.g. online and offline mediation) with the same platform. The present invention offers embodiments that provide a truly one, solid and efficient convergent mediation platform for online and offline mediation that supports all kinds of billing and charging applications, i.e. online cost control, IP prepaid, Rating and Balance Management. Furthermore, the convergent mediation system according the embodiment that is powered with the truly one technology platform can give extremely reliable, scalable and vendor independent environment with high throughput, high availability and low latency facilities for both online and off-line processing.

According to further embodiments, operators' can handle very cost efficiently their billing and charging though the network and OSS/BSS is complex. One aspect of an embodiment of the invention is that the platform is totally and continuously controlled by the system manager which also divides the system capacity to online and off-line sub processes.

By means of embodiments, the operators and service providers are able in a very innovative way to construct several billing and charging services for their customers, e.g. offering balance management services for subscribers. An example of such balance management services is that the pre-paid account is used first and after it is empty, the charge is made to postpaid. Business logic for this service is managed by the mediation solution. Another example of balance management service is that the convergent mediation solution uses both pre-paid and post-paid methods parallel so that, e.g. access is charged by postpaid but all or some of the services is charged by pre-paid.

As is apparent from the above disclosure, the present invention can be applied in a great variety of applications requiring fast and reliable processing of both online data and off-line data.

BRIEF DESCRIPTION OF DRAWINGS

For a more complete understanding of the present invention and the advantages thereof, the invention is now described with the aid of the examples and with reference to the following drawings, in which:

FIG. 4b presents a detailed block diagram of a part of the embodiment of FIG. 4a.

DEFINITIONS

Figure 1:
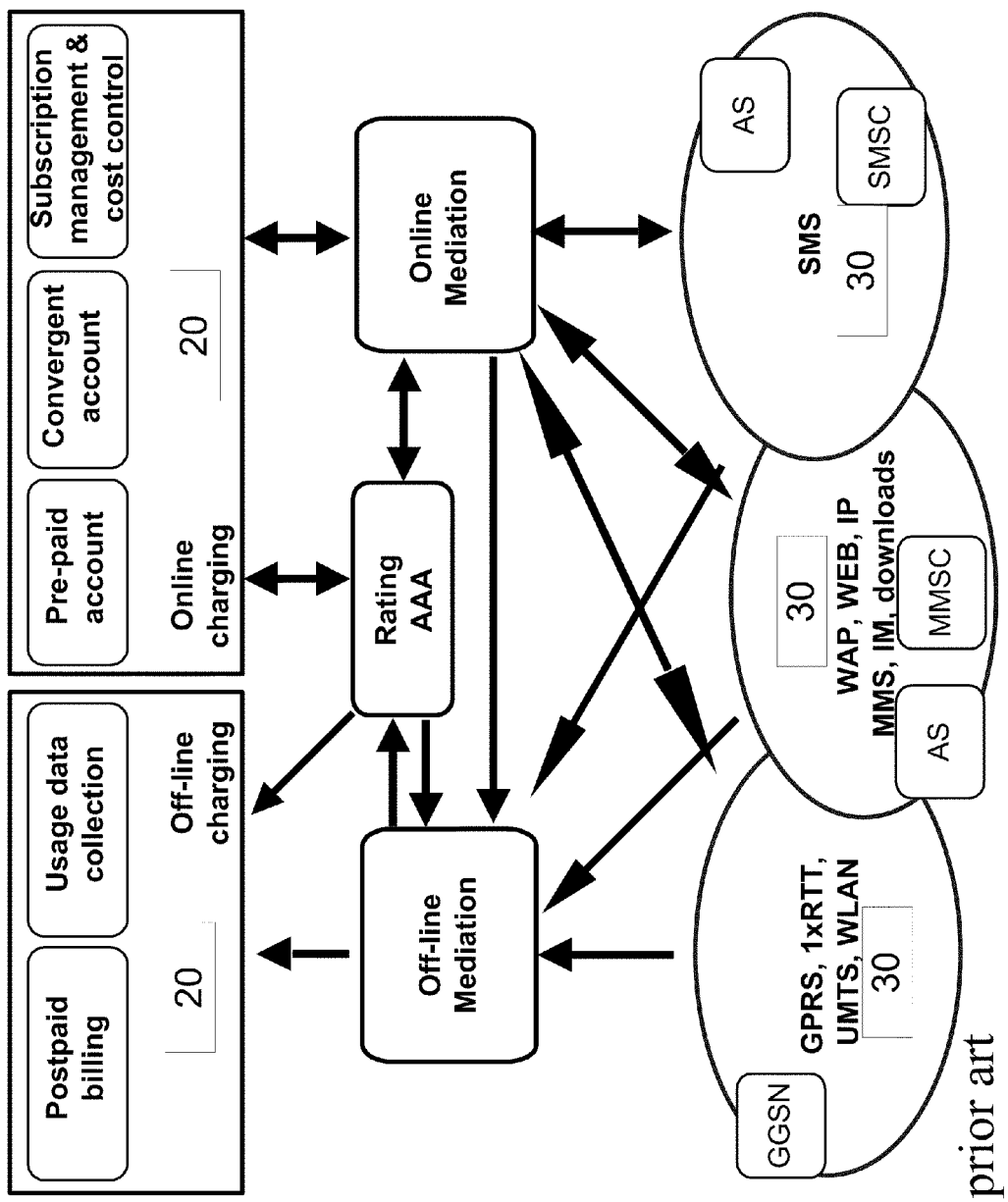
FIG. 1 presents a block diagram of an online and off-line mediation system according to prior art.

Event, event record, call detail record, usage record, transaction or service request are the items of data, or data items, equivalently processed in convergent mediation. Event is a transaction occurring in a telecommunications network or a service delivery platform, for instance. One event may contain all the information needed in e.g. account management or billing. Typically in modern networks where events are generated by all or most of the network elements, an event contains only a part of the information needed in e.g. account management or billing. Events are typically caused by actions taken by a subscriber while using telecommunication services. Events may also be based on actions taken by the telecommunication network or equipment connected to it, while executing telecommunications services. Some events may be even generated automatically while executing service programs and performing other functions for providing services to the customers.

Off-line mediation: Off-line mediation manages batch and real-time data streams and controls data collection, storing and processing routines for data items obtained from a communication network or from a service delivery platform. An efficient embodiment of an off-line mediation implementation can operate between any two systems that need to communicate with each other but are not directly integrated with one another. In most cases, the implementation operates between the communications network producing usage data and the destination OSS/BSS systems utilising this information framework, such as billing systems, fraud management systems and statistical analysis systems.

Online mediation: Interactive connectivity between communications network elements or service delivery platforms and Business Support Systems. One transaction in an online mediation environment is, for instance, a request-response message pair. An efficient embodiment of an online mediation implementation can use delivery control functionality and mid-session online metering for different control nodes. In an online mediation, processing of the data is performed before or during the user session or service usage. The mediation system prepares a response on the basis of the processed data and sends the prepared response to the system providing services to the user. This response is sent during, or preferably before, the user session or service usage. In other words, the term online mediation means that a response to a request is given during, or preferably before, the requested service is provided.

Convergent mediation: A single solution for collecting and processing of usage data, and managing service usage and charging for data items obtained from a communication network and/or a service delivery platform. The solution supports the processing of usage data in batch, real-time collection and online transactional modes. Service management and charging are supported online over a transactional interface. Network usage data and service management can be leveraged consistently from all voice and data services for end user with multiple applications including service control, rating, balance management, cost control, prepaid, billing, charging, interconnect, marketing and service assurance, for instance.

Communication network: Communication network includes all network elements in access and core networks as well as service delivery systems or platforms, which are involved in service delivery for end-customer. Access network can be mobile, fixed, broadband, cable network with any technology. Service delivery can be related to any services including voice, data, video, messaging and content services.

BEST MODE FOR CARRYING OUT THE INVENTION

Figure 2:
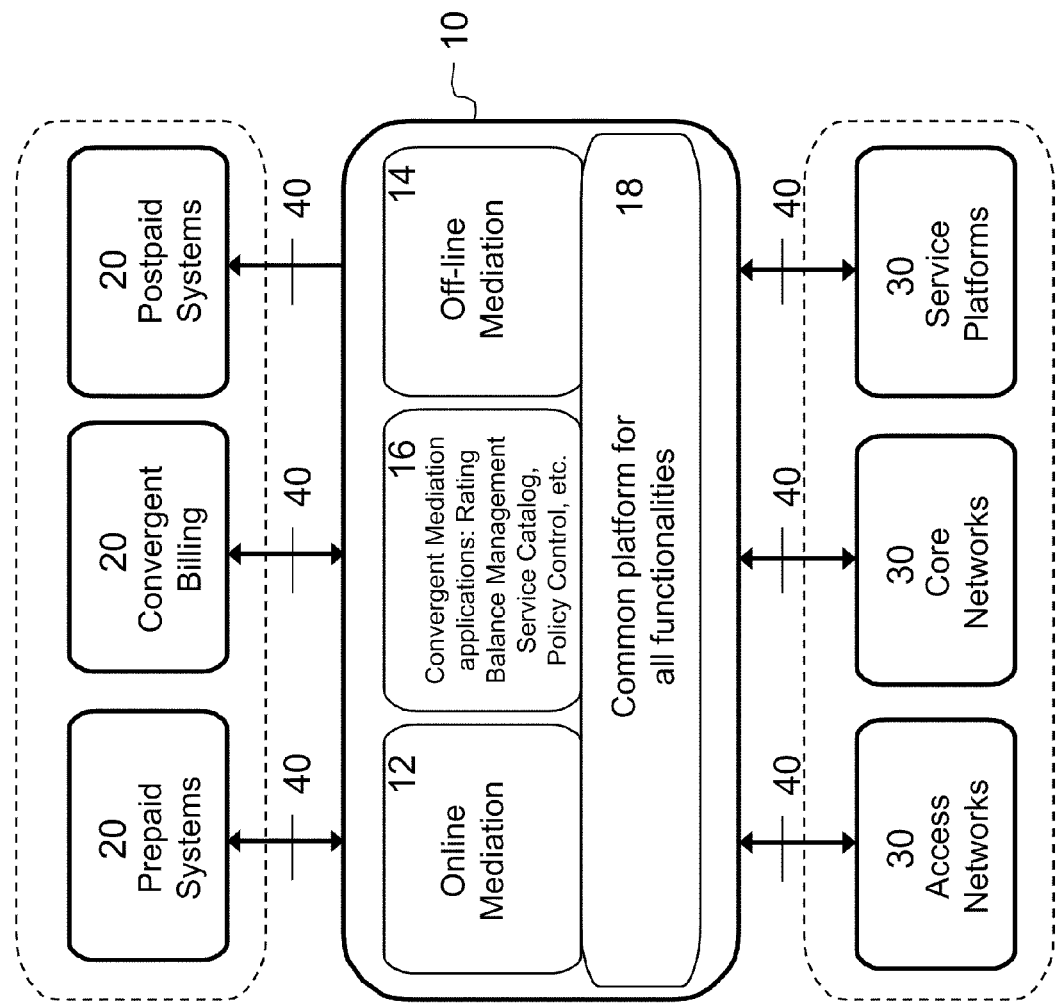
FIG. 2 presents a block diagram of a convergent mediation system according to an embodiment of the invention.

The embodiment of FIG. 2 described below provides a totally new kind of convergent mediation system 10 that has been especially designed for simultaneous online 12 and off-line 14 processing of streams of data items, such as event records, transactions and service requests. Usage data flows through the mediation solution as individual data items, which are passed to billing, traffic engineering, network planning, balance management, fraud detection and/or other OSS/BSS systems. The embodiment of FIG. 2 ensures that the OSS/BSS systems can be sure that their operations are based on accurate real-time information.

The billing system 20 receives event records from the convergent mediation system 10 in an instantly billable form. The convergent mediation system 10 allows various applications like Rating, Service Catalog and Policy Control 16. Billing can be based for example on volume, content value, QoS (Quality of Service) or time, or any combination of these. This applies also to other applications like rating, balance management and cost control. The convergent mediation system 10 enables charging for content and MMS services (Multimedia Messaging Service) by being capable of transmitting usage data for example from MMSC (Multimedia Messaging Service Center), content proxies and application servers. It enables also usage-based billing of VPNs (Virtual Private Network) and Internet connections, allowing for example charging on the basis of QoS and bandwidth. With aid of Service Catalog function 16 online rating of different and even complex product bundles is possible in the convergent mediation system 10. Policy Control 16 enables dynamic controlling mechanism in IMS and other broadband services. Typically the Policy Control provides dynamic bandwidth assignments for the data sessions. Another typical use case is access control to certain sites based on subscriber profile. Furthermore together with Service Catalog 16 the convergent mediation system provides powerful Policy Control which empowers operators to design their service offering efficiently.

Online mediation 12, off-line mediation 14 and various charging options and other functionalities 16 are processed and controlled by one common platform 18 including all the needed functionalities for processing data.

Real-time usage information allows OSS/BSS systems 20 to see in real-time what services subscribers have used and how the network resources are being used. This information can be analysed to find more competitive tariff structures and reduce customer churn. It can also help in defining end-user characteristics and planning how to better serve individual customers. Convergent Mediation applications such as balance management for customers' cost and credit control and fraud detection can use the information for controlling service usage.

The convergent mediation system 10 according to the embodiment has been designed to interface 40 with any network element in access and core network and service delivery systems 30 and to serve any OSS/BSS system 20. It can be used for both packet and circuit switched networks by all types including GSM, CDMA, 3G, 4G, Universal Mobile Telecommunications System (UMTS), Wireless Local Area Network (WLAN), Terrestrial Trunked Radio (TETRA), IP Multimedia Subsystem (IMS), Voice over IP (VoIP), IP group calls, Push-To-Talk (PTT), content service sessions, multi-player interactive game sessions. Convergent Mediation can be used by any type of operators including Network Operator, Service Provider, Virtual Network Operator (VNO) as well as Virtual Network Enablers (VNE). It provides numerous off-the-shelf standard and proprietary interfaces 40 to different OSS/BSS systems. The convergent mediation system 10 can handle any type of records generated by different types of network elements 30. Furthermore, the embodiment can handle and process these records despite differences in their structure or delivery method.

Embodiments of the invention relate to a convergent mediation system 10 for online processing 12 and off-line processing 14 of data obtained from a communications network 30 and/or a service delivery platform 30.

Generally speaking, in one of the general embodiments the convergent mediation system 10 comprises a common platform 18 for both of said online processing 12 and off-line processing 14 of data, and a system controller 110 adapted to dynamically allocate the processing power of the common platform 18 for the online processing 12 and off-line processing 14 of data. When both online 12 and off-line 14 processing are performed on a single platform 18, the processing power of the platform may be directed to the use of online processes 12 and off-line processes 14 according to the needs defined by the amount of data to be processed. This means also that the same hardware can be used for both of said processing types. As the online processing 12 aims at low latency, the online processing 12 capacity should be sized according to the estimated peak load. On the contrary, off-line processing 14 is not so time-critical but should preferably be very efficient in terms of throughput. In the embodiment using a single software platform and common hardware resources, it is possible to utilize some of the processing power both for online processing 12 during peak load times and for off-line processing 14 during off-peak times. Thus, there is no more need to dimension the hardware resources according to the peak-requirements of both online 12 and off-line 14 processes and it is possible to save in investment.

In another of the general embodiments, the convergent mediation system 10 comprises a plurality of independent nodes 120, 125 adapted to form processing streams 200 for the online data and off-line data. Each of the processing streams 200 comprises at least two independent nodes 120, 125 in sequence and a buffer 145 between each of the sequential nodes 120, 125. In the embodiment at least one, but preferably all, of the buffers 145 in the online processing streams 212 are formed by dedicated memory areas in random access memory. This embodiment provides fast processing, which is still very fail-proof.

In a further general embodiment, the convergent mediation system 10 comprises a plurality of independent nodes 120, 125 adapted to form processing streams 200 for the online data and off-line data. In this embodiment, each of the processing streams 200 comprises at least two nodes 120, 125 in sequence such that the first node in each of the online processing streams 212 is an online interface node 125, which is adapted to receive online data from the communications network 30 and send a response to the communications network 30. Furthermore, the system 10 is adapted to selectively form the content of the response to the communications network 30 in an online processing stream 212. This embodiment can provide an online stream 212 such that at least part of the processing is performed before the system responds to the network 30 or service delivery platform 30. A significant advantage provided by such an online stream 212 over a conventional real-time mediation is that there is no fraud window left due to the mediation system latency time, as the service fulfilment continues only after said delayed response that is given after the response from the online processing stream 212.

The above general embodiments are independent from each other but can be used all in the same convergent mediation system as well. These general embodiments, or any combination thereof, can be complimented with one or several further embodiments and system features which are described in the following.

In an embodiment, each of the independent nodes 120, 125 comprises a node application 140 and a node base 130. The node application 140 contains the logical rules according to which the independent node 120, 125 processes the data obtained from the communication network 30 and the node base 130 is adapted to provide basic functionalities for the processing node 120, 125. The node applications 140 and node bases 130 are typically software components running in a computer system including a host or a plurality of hosts.

In an embodiment, the basic functionalities provided by the node base 130 include external interfaces of the processing node 120, 125 and an interface to the node application 140.

In an embodiment, the node bases 130 of all of the independent nodes 120, 125 are identical to each other. This embodiment contributes to a truly one platform architecture 18 as all of the node applications 140 are running on top of identical node bases 130.

In a corresponding fashion, the system can also include a group or groups of processing nodes 120, 125 having also their node applications identical to each other.

According an embodiment, the system 10 comprises at least one online processing stream 212, which includes at least three independent nodes 120, 125 in sequence and buffers 145 between each of the sequential nodes 120, 125 such that the buffers 145 are formed by dedicated memory areas in at least one random access memory.

According a further embodiment using an online interface node 125, the system 10 is adapted to perform an access control operation when selectively forming the content of the response to the communications network 30 or the service delivery platform 30. The selectively formed content of the response is adapted to signify either a positive clearance allowing the communications network to provide a service or a negative clearance preventing the communications network 30 from providing the service. In an embodiment, the online interface node 125 is responsive to the received online data to forward it to the next node in one of the online processing streams 212 and wait for a response from the online processing stream 212 before sending the response to the communications network 30.

The system can also be provided with an off-line interface node 120, which is used as the first node in at least one of the off-line processing streams 214. This kind of an off-line interface node 120 is adapted to collect off-line data from the communications network 30 in the form of event records. Furthermore, the system can be provided with combined interface nodes 120, 125 capable of both receiving data and collecting data. Then, the combined interface node preferably includes a routine for identifying the type of processing (online or off-line) required by the obtained data in order to select a proper stream to which to forward the data for processing. In an embodiment providing separate nodes 120, 125 for receiving data for online processing 12 and collecting data for off-line processing 14, the system's interfaces 40 have already been configured to perform the selection of the processing type on the basis of the route of incoming data.

In an embodiment, the system comprises an internode transport layer including the buffers 145 between each of the sequential nodes 120, 125. Such an internode transport layer can comprise a plurality of buffers 145, which can be sockets, shared random access memories and/or disk memories. In such embodiments, it is preferable that the basic functionalities of the node base 130 includes an interface to the internode transport layer allowing the processing node 120, 125 to read data from at least one of the buffers 145 and write data in at least one of the buffers 145. Furthermore in an embodiment, the node applications 140 and the internode transport layer are independent from each other.

In a further embodiment using the internode transport layer, the system is adapted to process an item of data under processing in a processing stream 200 such that the internode transport layer keeps a copy of the item of data in a preceding buffer 145 until a corresponding item of data has been successfully written in a succeeding buffer 145 in the processing stream 200. Thus, the system 10 is adapted to remove any data from the buffer 145 only after successfully performing the processing operation in the succeeding processing node 120, 125 in the processing stream 200. This prevents data losses due to process failures in the system 10. This is because the system 10 can, in case of a processing node shut-down, replace the shut-down node in the processing stream 200 with a new processing node 120, 125, which starts to process the data in the preceding buffer 145.

The system 10 has further embodiments also in view of the dynamical allocation of the processing power. In this context, the dynamical allocation may occur instantly or may be performed during certain intervals depending on the embodiment used. Such intervals may be during each night, once a week or once a month, for instance. The system 10 may also be provided with triggers triggering the dynamical allocation or re-allocation. The triggered allocation can be done instantly or performed during the next expected off-peak time of the system, for instance. In a preferred dynamical allocation embodiment, the system 10 performs the allocation or re-allocation automatically without human intervention under the control of the program components of the system. Embodiments utilizing directions of a human operator are also possible.

In an embodiment with dynamic allocation, the allocation is controlled by a system controller 110, which is a computer process run in the mediation system 10. In an embodiment, the functions of the system controller 110, or at least part of them, are performed by a Node Manager 110 described in greater detail in context of specific examples part of this document.

In an embodiment, the system controller 110 is adapted to prioritize the online processing 12 of data over the off-line processing 14 of data when allocating the processing power of the common platform 18. This provides for the low latency for the online processing 12.

In a further embodiment, the system controller 110 is adapted to monitor 112 a reception rate of the obtained data and use the reception rate as a parameter in the dynamical allocation of the processing power. Such an embodiment can react quickly to sudden changes in the amount of received data.

In an embodiment, the system controller 110 is adapted to monitor 112 a processing load caused by the online processing 12 of data and use the processing load as a parameter in the dynamical allocation of the processing power. Such an embodiment can base the allocation decision on the actual processing load caused by the processed data. In a further embodiment, the system 10 may also produce estimates of such a processing load as a function of time of day or day of the week and allocate processing power based on such estimates, too.

In an embodiment, the system 10 has a determined minimum reserve threshold and the system controller 110 is adapted to use the minimum reserve threshold as a parameter in the dynamical allocation. In such an embodiment, the system controller 110 allocates more processing power for the online processing 12 of data when the current processing power allocated to the online processing 12 of data exceeds the current processing load caused by the online processing 12 of data by a value less than the minimum reserve threshold. This embodiment helps the system 10 in keeping a sufficient reserve processing power for possible online processing 12 bursts. Further, this embodiment can be provided with a determined maximum reserve threshold whereby the system controller 110 is adapted to use the maximum reserve threshold as a parameter in the dynamical allocation such that the system controller 110 allocates less processing power for the online processing 12 of data when the current processing power allocated to the online processing 12 of data exceeds the current processing load caused by the online processing 12 of data by a value greater than the maximum reserve threshold. This embodiment ensures that the reserve processing power for possible online processing 12 bursts is not excessive thus freeing the system resources for other processes, e.g. off-line processing 14 of data. Indeed, in an embodiment, the system controller 110 is adapted to allocate as much of the free processing power as is necessary to the off-line processing 14 of data, wherein the free processing power refers to the processing power of the common platform 18 not allocated to the online processing 12 of data. This embodiment aims at maximizing the throughput of off-line data without compromising low latency for online data processing.

In an embodiment, the allocation of processing power is done by controlling the number of processing nodes performing online processing 12 and/or the number of processing nodes performing off-line processing 14. In another embodiment, the allocation of processing power is done by controlling the number of whole online processing streams 212 and/or the number of off-line processing streams 214.

In a further embodiment, the system controller 110 is adapted to replace 112 a defective node 120, 125 in a processing stream 200 with a properly functioning processing node 120, 125 in case of a processing node malfunction situation. In an embodiment, this function is performed by a Node Manager 110 described in greater detail in context of specific examples part of this document.

An embodiment seeks to guarantee high availability of service by providing the system with parallel processing streams 200 and controlling the system 10 such that, in case of a malfunction in a processing stream 200, at least one of the parallel processing streams 200 immediately takes the place of the defective processing stream 200. In an embodiment, wherein at least one of the processing streams 200 comprises parallel processing nodes 120, 125, the system 10 is adapted to guarantee high availability of service such that, in case of a malfunction of a processing node 120, 125, the parallel processing node immediately takes the place of the defective processing node 120, 125.

According to embodiments, the system comprises also an interface to an OSS/BSS system 20 for submitting the processed data to said OSS/BSS system 20. In a further embodiment, the interface 40 to the OSS/BSS system 20 is a two-way interface 40 and the convergent mediation system 10 is responsive to the data received from the OSS/BSS system 20 via said two-way interface 40.

After the above discussion of some of the embodiments of our invention on a higher system level, we will in the following discuss several specific examples and product embodiments that utilize some or all of the above system-level features. Hence, the following examples and embodiments can include the above embodiments in any combination and also in itself discloses several other embodiments and features that can be combined with the above-described ones.

Features and Benefits of an Embodiment

In the following, arguments are presented for the profitability of a solution according to an embodiment of the invention, together with presentation of some of the novel features of the embodiment.

Prepaid Charging and Fraud Control

Many service providers seek the possibility to introduce prepaid charging for data and voice services utilising their existing billing based systems, that is, by collection and processing of event records. It should be noted that this type of solution can be seen as a hot billing solution for prepaid charging and it is never online as it always has a fraud window. At the first glance, this seems to be the easiest and most cost-effective approach, but a further analysis reveals several problems:

- The collection and processing of event records can become very complex, especially for data services requiring collection, aggregation and correlation of event records from several network elements both in the access and service network.
- A solution based on collection only introduces a fraud window, the length of the window depending on the collection and processing speed of the off-line mediation solution. The fraud window can cause a revenue leakage, especially for operators offering third-party mobile value-added services or having customers with high data service usage.
- The solution requires a mechanism for controlling service usage in case, for example, the subscriber's prepaid balance runs out.
- It is very hard to implement any value added features, such as Advice of Charge (AoC) or notifications in the off-line mediation based solution.

Convergent Service Offering

In brief, service convergence means that all subscribers, regardless of their payment method, are offered the same services. Today, most service providers use separate mediation and charging solutions for prepaid and post-paid subscribers. This increases operator costs and the time it takes to launch new services. When both subscriber segments are supported by a same convergent mediation solution, significant improvements are achieved in time-to-market for new services. There are technical reasons why there typically are separated environments for prepaid and postpaid subscribers:

- Connectivity to several different types of network elements in online mode is seldom available in the legacy postpaid solutions and systems.

Legacy prepaid systems are designed for voice prepaid control and they lack the flexibility required by the data usage control functionality.

Further, an embodiment of the invention enables service providers to manage their mediation and charging needs with single solution for both prepaid and postpaid charging. This saves time for service providers when they implement new service configurations or modifications as they are done in one place. Graphical tools that the solution offers also make the configuration of new services easier and faster when everything can be visualised.

Powerful Cost Control—Value for Operator and End-Users

According to an embodiment of the invention, the convergent mediation system 10 supports cost control with balance management functionality. With the solution, service providers are able to avoid postpaid users' credit overruns. This is important especially in 3rd party services, where the service provider needs to make payments to 3rd party partners according to service usage. Also end-users value cost control, but from a spending management point of view. With embodiments, end-users are able to manage their spending, for example, with service specific balances. The convergent mediation system 10 is based on the concept of pre-delivery charging and controlling. This means that a customer's validity can be verified before the service is delivered. Therefore, as subscribers are authorised before their service usage, there is no revenue leakage.

With embodiments, end-users are able to manage their spending, for example with service specific balances. The solutions are based on the concept of pre-delivery charging and controlling. This means that a customer's validity can be verified before the service is delivered. Therefore, as subscribers are authorised before their service usage there is no revenue leakage.

Convergent Rating with Service Convergence—Enabling Competitive Charging Models

The convergent mediation system 10 with rating application provides advanced and flexible rating of any type of service for prepaid and postpaid accounts. Examples include rating of voice, data, multimedia messaging and content services carrying out product packaging, bundles as well as enhancing marketing with promotions and bonuses for these services. Variables such as campaigns, subscription types, times and day types and specific pricing schemes can be combined in virtually any possible way. In addition, specific pricing schemes can be calculated for each combination to reach a high level of sophistication. These advanced and attractive charging models will increase service usage and service revenue for operators and service providers.

Being competitive in the service provider market space requires more than a good service offering. It requires flexible and innovative charging models and careful consideration of customer segment price sensitivity.

Convergent rating with service convergence enables the same services for all subscribers. Service convergence is provided by the convergent mediation functionality, bringing together the different services from various types of networks and services. This enables flexible rating rules for all services and linking of subscriber profiles, product packages and bundles for competitive charging models.

Managing Change in the Charging Infrastructure

Currently, the common way to handle the rating and account management of prepaid and postpaid subscribers is by running two separate billing systems: one for prepaid and one for postpaid billing. In the long run, with the requirements for service and payment convergence this causes a huge challenge as the operator has to manage several systems and be able to apply the same billing and charging models for all services and payment types.

This raises the following challenges:

Choosing the right phasing strategy towards a uniform charging platform that offers a centralised management of all services and rating models.

Managing changes in the charging environment.

Ensuring interoperability of the convergent charging system with different networks, technologies and vendor equipment.

Connecting voice charging control to the same charging platform with data services. Only this would enable the introduction of cross-service value packages for voice and other services.

Finding an alternative to the expensive legacy prepaid system.

An embodiment of the invention overcomes the challenges of convergent charging. Convergent Mediation solution enables operators to make smooth transition from existing separated postpaid and prepaid system environments to fully convergent charging environment.

Cost Efficiency

The convergent mediation system 10 provides reliability and cost savings that are needed in today's billing and charging environments. When all the mediation requirements are managed in a single solution for both prepaid and postpaid subscribers, cost savings are clear. With a single solution new mediation and charging rules can be configured in a single place. Embodiments of the present invention are reliable and the convergent mediation system 10 can meet the high availability requirements that are needed in today's telecom environment.

An embodiment of the invention is also very hardware efficient. The solution performance is among the best in convergent mediation world. With the convergent mediation system 10 according to such an embodiment, operators and service providers are able to reduce their hardware costs.

An aspect of an embodiment of the invention is that the convergent mediation system 10 closes the fraud window of a hot billing based solution while providing the flexibility and functionality of typical postpaid environment, thus adding value to the service provider's investment.

Vendor Independence—Focus on Performance and Cost-Efficiency

With complex network 30 and business support systems 20 in a multiswitch/system type of environment, it is beneficial to be able to make cost and performance comparisons between different players. The embodiment enables a vendor independent choice. Operators and service providers need to consider the performance and cost-efficiency. Due to these points, the convergent mediation solution 10 can be easily updated in a highly complex, multi-vendor environment. Adding new network element 30 and OSS/BSS 20 interfaces 40 is fast, which allows rapid and cost-efficient launching of new services.

Ability to Create a Best-of-Breed, Convertible Customer Care and Billing System

A convergent mediation system 10 according to the embodiment is truly independent from any network element 30 and billing system 20 vendor. The convergent mediation system 10 is capable of processing online 12 and off-line 14 data from any communications network 30 or service delivery platform 30 (3G, 4G, Universal Mobile Telecommunications System (UMTS), Wireless Local Area Network (WLAN), Terrestrial Trunked Radio (TETRA), IP Multimedia Subsystem (IMS), Voice over IP (VoIP), IP group calls, Push-To-Talk (PTT), content service sessions, multiplayer interactive game sessions, etc.) and of delivering it to any Operations or Business Support System 20—regardless of operators' or service providers' network or OSS/BSS vendor.

Future Proof Solution

The convergent mediation system 10 is easily expandable to any new network 30 or service technology 30 that arises. With the support of new and existing technologies, the embodiments enable a phased approach for full convergent charging environment.

Scalability and Distributability

A convergent mediation system 10 according to the embodiment is extendable from handling a small number of event records up to billions of events per day. Scalability can be reached simply by multiplying mediation processes (e.g. balance check, analysis, aggregation, rating) within the host. If the processing power of a single host is not sufficient, the mediation processes can be distributed to one or more additional hosts, in which case the system automatically takes care of transferring the event record data to the host it is next processed in. The hosts are typically UNIX, LINUX or such-like efficient computers. Hosts from different system vendors can be mixed without restrictions.

Easier Management and Monitoring of Processing with Large Networks

Prior art batch-based processing is very difficult to monitor with large networks. The solution according to the embodiment collects and stores all events and other data related to the mediation processes into a single, centralised storage, and allows a possibility to send them to e.g. a third party network management system. This allows easy, centralised management and monitoring of the system independently of the size of the network.

Reliability

According to the embodiment the convergent mediation system 10 is highly available and scales up to the needs that even the largest service providers have for mediation and charging systems. The various embodiments of the present invention can be implemented in many kinds of networks and technology environments. When services are available for the subscribers and they are billed and charged accurately, also the service provider's image becomes more reliable.

The convergent mediation system 10 according to the embodiment has a functional structure that is based on totally new elements for processing events in an inventive environment. The processes can function independently of each other and the managing system. All data is buffered for any kind of error and system overload situations.

The system 10 is designed so that there is no single point of failure. This means that as long as the host server is running, and there is free space in the host's file system or shared memory, neither the online data processing 12 nor off-line record processing 14 is interrupted.

The convergent mediation system 10 according to the embodiment is a system with online configuration that is available 24/7. It is ready to receive data items, such as service requests or records, from the network any time. All mediation processes of the convergent mediation system 10, such as data analysis and correlation, run independently of each other. Even if one of the processes is affected for example by a network error, all the other processes continue running as before. The mediation processes of the convergent mediation system 10 run independently of the process management system. They can function temporarily without system critical resources, such as the system database 150. All data is automatically buffered 145 to ensure that no event records are lost in any kind of error situation.

Configurability

Users can define freely which processes to include in a convergent mediation process chain 200. There can be several process chains (streams) 200 functioning concurrently. Each process is fully configurable, making it possible to define accurate rules for usage data handling. The order of the mediation processes is fully configurable and same processes can be multiplied if needed.

The configuration of the process chains can be done without disturbing the ongoing processing, and the user can decide when to activate the changes into the configuration. The version control of the configurations allows returning to an earlier working configuration version in case of problems.

Functionality of an Embodiment

Figure 3:
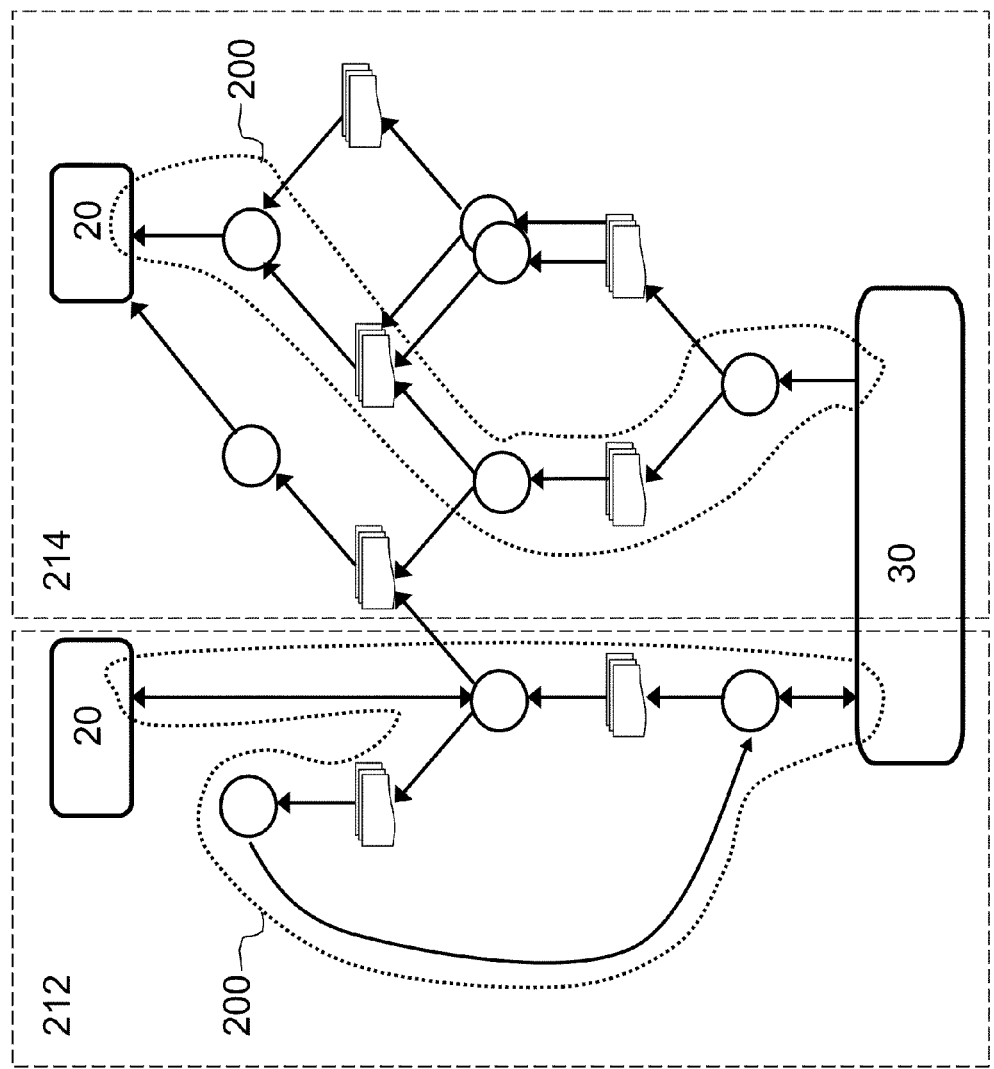
FIG. 3 presents a block diagram of different streams according to an embodiment of the invention.

Embodiments of the present invention provide online 12 and offline 14 mediation. They also provide an excellent ground for offering a convergent mediation solution for service providers who tackle the challenges of the convergent environment they face today. The present invention is based on two main modules or main streams—online mediation stream 212 and off-line mediation stream 214 as illustrated in the FIG. 3.

Operators can provide versatile charging models, end users can be informed of the actual cost of service purchase and credit losses can be controlled. Chargeable online service can be offered to an unknown client. It is not practically necessary to give credit card number to unreliable party for charging Internet purchases.

The main modules can provide different processes like collection, network interfacing, validation, enrichment, filtering, aggregation, correlation, decoding, encoding, error correction, session control, authorisation, balance operations such as debit, credit, check, reservation and microbalance; rating, re-rating, charging, recharging, usage history recording, conversion and distribution. Furthermore an embodiment of the invention can also provide several additional functionalities such as auditing, revenue sharing, billing data reporting, correction and collection; pricing, testing, revenue assurance, voucher management and top-upping; CRM, service catalog; account, balance, service, subscriber and retention management. The varied functionality allows OSS/BSS systems to receive usage data just as they want it.

Also arrangements for managing end-user session online charging are presented. In an embodiment of the invention, online charging is performed in a system independent online mediation system. It aims to provide a complete set of charging models and capabilities. These are obtained by combining and managing access, media and service level charging under a pricing plan mechanism which enables the changing of charging rules within an active charging session.

An embodiment of the present invention makes it possible to construct a reliable convergent mediation system 10 and method with effective control of services and fraud prevention. The inventive concept allows also several useful and advantageous embodiments, which provide further advantages.

An embodiment of the invention supports different types of network elements (such as MSC, IN, IN-Prepaid, content and multimedia servers, SMSC, MMSC, mobile soft switches, media gateway controllers, routers, LDAP servers, packet analyzers, VAS platforms, Radius AAA servers, FTP servers, GGSN, SGSN, CG, Push-To-Talk Over Cellular, IMS platforms, Ducont, STARHOME, INFO2CELL and In-house service delivery platforms), protocols (such as Diameter, Parlay, Radius, X.25, FTM, FTAM, SFTP, SCP, GTP', SNMP, LFAP, DDP, LDAP, SQL, CORBA, HTTP/HTTPS, SS7) and data formats (such as XML, CSV, ASN.1, TAP3, TLV, XDR, IPDR, (IAC)AMA, IACHASTA, BCD (straight, swapped, reversed, telephony), any separator supported variable length, blocked, structured, positional). This means that one event or request may comprise e.g. access/bearer, service or media requests that are combined together in the convergent mediation system 10.

Some of the main functions of a convergent mediation solution 10 according to an embodiment of the invention are described below. Each of these functions is configurable.

Convergent Mediation—Featuring Online Mediation and Delivery Control

Convergent Mediation 10 enables the connectivity to different type of networks 30 and business support systems 20 for prepaid charging and postpaid billing. An embodiment of the invention hides the network complexity from the charging point of view and links services, subscribers and payment types in an intelligent manner.

From the charging point of view, Convergent Mediation 10 provides Online Delivery Control (pre-delivery charging and controlling) meaning that

- The solution authorises and authenticates the user before and during service delivery—if the subscriber has, for example, not enough balance for the service delivery, the delivery of the service is denied.
- The solution offers various charging possibilities, for example, direct debit, debit-credit, or balance reservation and confirmation models
- For data and voice sessions, a microbalance model can also be used for minimising the traffic to the prepaid system
- Additionally, low-balance notifications or Advice of Charge (AoC) can be used for making the service usage more user friendly
- The solution can be utilised as an example for offering subscription-based services for prepaid and postpaid users In addition, the convergent mediation system 10 provides online-, real-time- and batch-mode connectivity for all services and it supports correlation and other typical mediation functionalities for different operation modes. The solution is vendor, network and service independent and it enables change management and phase-based solution deployment.

In an embodiment, all of these features are built-in features requiring no additional components to be introduced.

Off-Line Mediation—Robust Backbone for Convergent Mediation

Off-line Mediation function hides the complexity of networks from the billing and other BSS systems. It has full mediation capabilities for service providers with any type of network. The solution has flexible and modular architecture with a rich set of tools for system configuration. The tools enable quick and effective reconfiguration of business logic for changing charging of services and creating new services. It enables usage based charging of all services by separating the infrastructure and network architecture. Usage data is instantly billable and the billing can be based on transactions, content, service, quality, time, volume or any combination of these.

Off-line mediation functionality provides:
- Collection of usage data from any network element or usage data centre
- Advanced data processing features, such as records sequence and duplicate checking, filtering, validation and enrichment via modern, web-based graphical business logic tool
- Aggregation, correlation and grouping of data
- Delivering data to target systems
- Centralised control and correction of rejected data via web-based user interface Rating The convergent mediation system 10 includes a rating application designed primarily for rating modern operator services, irrelevant of the payment method chosen by the subscriber. The rating function supports a number of rating scenarios from simple call rating to rating subscriber-specific services with the usage history on a corporate level.

The convergent mediation system 10 with rating application rates transaction based on both the information in the transaction itself and according to the predefined rules in the rating function.

Rating provides the following functionality:
- A uniform list of services for managing the rating rules in a centralised manner
- Hosted rating functionality, enabling the fetching of rating and subscriber profile data from external systems and deploying those for centralised rating processing
- Flexible rating rules enabling easy configuration of various unit price structures and price amendments
- History-based rating for building value packages and discounts
- Subscriber profile-based rating
- Campaigns and cross-product bundles Balance Management The convergent mediation system 10 provides balance management application for subscriber, subscriber groups or service specific convergent accounts. With balance management, service providers can offer the following prepaid and postpaid account functionalities from the charging point of view:
- support for bonus accounts
- support for subscription service accounts
- support for spending control service accounts
- support for family and corporate account concepts In addition to convergent accounts, the balance management includes features for voucher handling and secure handling of monetary value. Therefore, with the above-mentioned convergent account functionality a service provider can replace the existing expensive and rigid legacy prepaid systems as well as the postpaid accounts in the billing system side.

The convergent account functionality offers service providers tools to offer their subscribers a possibility to pay for different telecom services the way they choose. At the same time it offers both subscribers and the service provider control for customer service usage with competitive charging models.

Convergent account functionality supports several balances per subscriber and it can handle grouping of balances as well as balance hierarchies. Additionally, there are notification service features enabling low balance and Advice of Charge (AoC) type of notifications for the subscribers.

Service Implementation

When business rules or business logic for new services are implemented or changed, it should impact existing service charging operation as little as possible. In addition, configuration should be easy enough to enable fast introduction of new services. The convergent mediation system 10 offers several tools that enable fast and reliable configuration of new business logics and charging rules.

For creating business logic for mediation and charging processes, the convergent mediation system 10 offers a graphical tool 160 that helps users to configure business logics in a controlled way. When using the tool, the user is able to visualise the business logic, which helps ensure that configuration is correct and optimised. The tool also allows the user to modify the business logics later, if needed. A mediation and charging process stream typically requires business logic in order to process the event records for billing. Typical business logic includes filtering, validation, correlation, and authorisation, conversion, rating and mapping functions.

In addition to business logic configuration, integration to operator environment is essential part of the service implementation. Integration should be done so that there are minimum changes to existing billing, prepaid and network equipment. Business logics are not tied to any particular interfaces so all network elements can share the same logic if required.

An embodiment of the convergent mediation system 10 can provide productised support for over 400 different interfaces for both online and off-line protocols.

Testing Support

Once all the integrations and business logic configurations are done, it is always essential to test the logics to ensure that they work as planned. The convergent mediation system 10 provides automated testing that is part of the business logic tool. It helps users to prepare test cases, execute and compare tests and their results. This process helps operators to verify that the new configuration works and has not had an impact on existing functions.

Another aspect that smoothens the testing phase is Library management. It provides the deployment of pre-configured mediation and charging streams for different services and interfaces. This way testing and comparing of existing streams for new services is straightforward. When the operator can reuse existing streams and logics, time is saved when testing a new service implementation.

Service request tracking is another aspect that helps operators to debug and analyse their business logic implementations. Tracking helps operators to view graphical step-by-step request execution trace and analyse in-depth analysis for testing and debugging results.

High Availability and Scalability

When operating in prepaid mode, low latency and high availability are critical factors when measuring the success of service. The convergent mediation system 10 is very focused on these two items. High availability is ensured by an N+M configuration where N represents the number of nodes processing transactions and M the number of standby nodes in case of any of the active nodes goes down. In addition to node configuration, all interfaces can be duplicated to ensure that no transactions or events are lost.

Scalability is another aspect that the convergent mediation system addresses. The system 10 has been designed for online applications 12 while maintaining extremely high throughput for off-line events 14. The requirements for system performance include low latency and extremely high tolerance for parallel transactions. Together these two features ensure that the end user's Quality of Service (QoS) is not compromised and the system is able to serve masses of subscribers with sensible hardware—even when the external systems might be slow.

There are three ways how to increase the capacity of the convergent mediation system 10:
  Vertical scalability: adding memory and processors (CPUs) increases the capacity of a single host.
  Horizontal scalability: new servers can be added in a plug-and-play fashion without disrupting the system.
  Geographical scalability: distributing the control nodes over multiple sites enhances the availability and scalability of large installations.

Low Latency

Low latency is required in request-response type streams, for example when a user is waiting for authentication. The convergent mediation system 10 achieves very low latencies by using shared memory transport mechanism 145 between the processing nodes 120, 125. The shared memory transport mechanism 145 makes it possible to build large streams 200 where the processing 12, 14 has been logically divided into the nodes 120, 125 and still simultaneously achieve high throughput by using the scalability features of the system 10.

Post-Launch Follow-Up

According to an embodiment of the invention, the convergent mediation system 10 capabilities do not stop at running of the system. The system also provides reports on how services have been used and how accurate billing and charging are. This helps to analyse, for example, what were the popular services and when were they used. The reports can then be used to plan next service offering and how their charging will be done.

Charging Rule Provisioning

When a new subscription, service package or charging model is created, the customer care system normally sends an activation request to the management application programming interface (API) of Convergent Mediation Solution.

Embodiments store the charging rule data to the configuration database and further enable the charging rule provisioning towards control nodes in the network if necessary.

The convergent mediation system management API is an open interface to all applications that must have access to subscription hierarchies and balance information. The management API supports, for example, the following request types:
  provisioning of new subscribers, rating rules, profiles and balances
  modifying and deletion of subscribers, rating rules, profiles and balances
  query of balance, campaign status, last transaction or balance
  recharge of balances
  notifications to be sent to mediation for subscriber delivery All subscription and balance management functions provided by the management API are also available via the user interface. However, when using the UI to perform subscription or balance operations, it is important to configure the convergent mediation system so that it sends the event records or notifications to external systems in a manner that ensures that systems such as the billing system or CRM database are maintained synchronised with the convergent mediation system.

Recognition of Incoming Data in Convergent Mediation System

An embodiment of the invention recognizes the incoming data whether it needs online 12 or off-line 14 processing.

Collection

The convergent mediation system 10 according to the embodiment is capable of interfacing with any network or service—e.g. 3G, 4G, Universal Mobile Telecommunications System (UMTS), Wireless Local Area Network (WLAN), Terrestrial Trunked Radio (TETRA), IP Multimedia Subsystem (IMS), Voice over IP (VoIP), IP group calls, Push-To-Talk (PTT), content service sessions, multiplayer interactive game sessions—or any combination of presented network technologies.

Validation and Analysis

When receiving event records from the network, the mediation solution checks them for duplicates and verifies their sequence. By doing this, it ensures that the numerous event records stream into the system in correct order and that none of them are missing or delayed or tries to enter the system for the second time.

After collection, the mediation solution carefully examines and analyses the contents of the event records. It checks that all values included in the event record fields are applicable and in a correct format. It can join fields and insert additional values to them when necessary.

Enrichment

The mediation solution according to the embodiment is able to enrich event records by completing them with information from external sources. It can, for example, fetch the information on which customer category a specified service user belongs to, and add this information to the event record. Marking of customer category helps other processes such as billing.

Aggregation and Correlation

In aggregation, the mediation solution according to the embodiment merges partial event records produced by a single service usage and coming from the same network source. Aggregation thus allows the OSS/BSS systems to receive only one billable record from each service usage.

Correlation involves combining event records also, but the records to be correlated come from different sources. A GPRS session, for example, produces S-CDRs (Call Detail Record) in SGSN and G-CDRs in GGSN that the mediation solution is able to correlate into one output record.

The records to be correlated may come at the same time from access network and content platform, which is the case in a content usage session. The mediation solution then completes the event records from content platform with the user identification fetched from access network. The correlated records contain all the information needed for content charging: who the user was, what services he used and for how long, as well as the value of the services.

Rating

The rating functionality of the mediation solution according to the embodiment allows pricing of event records in the mediation system. Flexible rating criteria and various pricing models can be used as rating bases. Also subscriber specific rating is possible. The rated event records can be sent directly from the mediation solution to balance management and other applications without any intervention from billing system.

Storing

All records of the mediation solution according to the embodiment can be stored into a long-term event database. The event records can be stored into the database during different mediation processes, for example before and after aggregation, correlation or rating.

The long-term storage capability allows to view and fetch records from the database at all times and check how different mediation processes have modified them. The stored event data gives valuable information about subscribers' network usage in the long run.

Formatting

Before delivering the fully processed event records to the OSS/BSS systems, the mediation solution according to the embodiment converts them to formats compatible with these systems. The mediation solution is able to convert the records either to a standard format or to operators' proprietary formats. Due to conversion, an OSS/BSS system receives all usage information from the network in a uniform, predefined form. It should be noticed that the formatting of event records may be done also in any point or points through the processing chain (stream) of the mediation process.

Distribution

The mediation solution according to the embodiment is able to simultaneously interface with multiple different OSS/BSS systems. Even if it performs all its collection and other processes in real-time, it is able to deliver the processed records to the OSS/BSS systems either through a configured real-time protocol or a file interface.

Architecture of a Mediation Solution According to an Embodiment

The keywords of the convergent mediation system 10 architecture are simplicity and straightforwardness. The truly one platform 18 ideology and modular design of the solution according to an embodiment of the invention enables real-time and distributable processes, reliable operation, low latency and high performance for both online processing 12 and off-line processing 14 of data.

The convergent mediation system 10 according to the embodiment includes mediation processes 16, managers controlling the processes 110, system database 150 and web-based user interface 160. Mediation processes 16 such as balance check, cost control, collection, analysis, pre-delivery control, duplicate checking, aggregation, correlation and conversion are linked together to construct processing streams 200. Streams are fully customisable and there can be multiple streams simultaneously active.

Figure 4A:
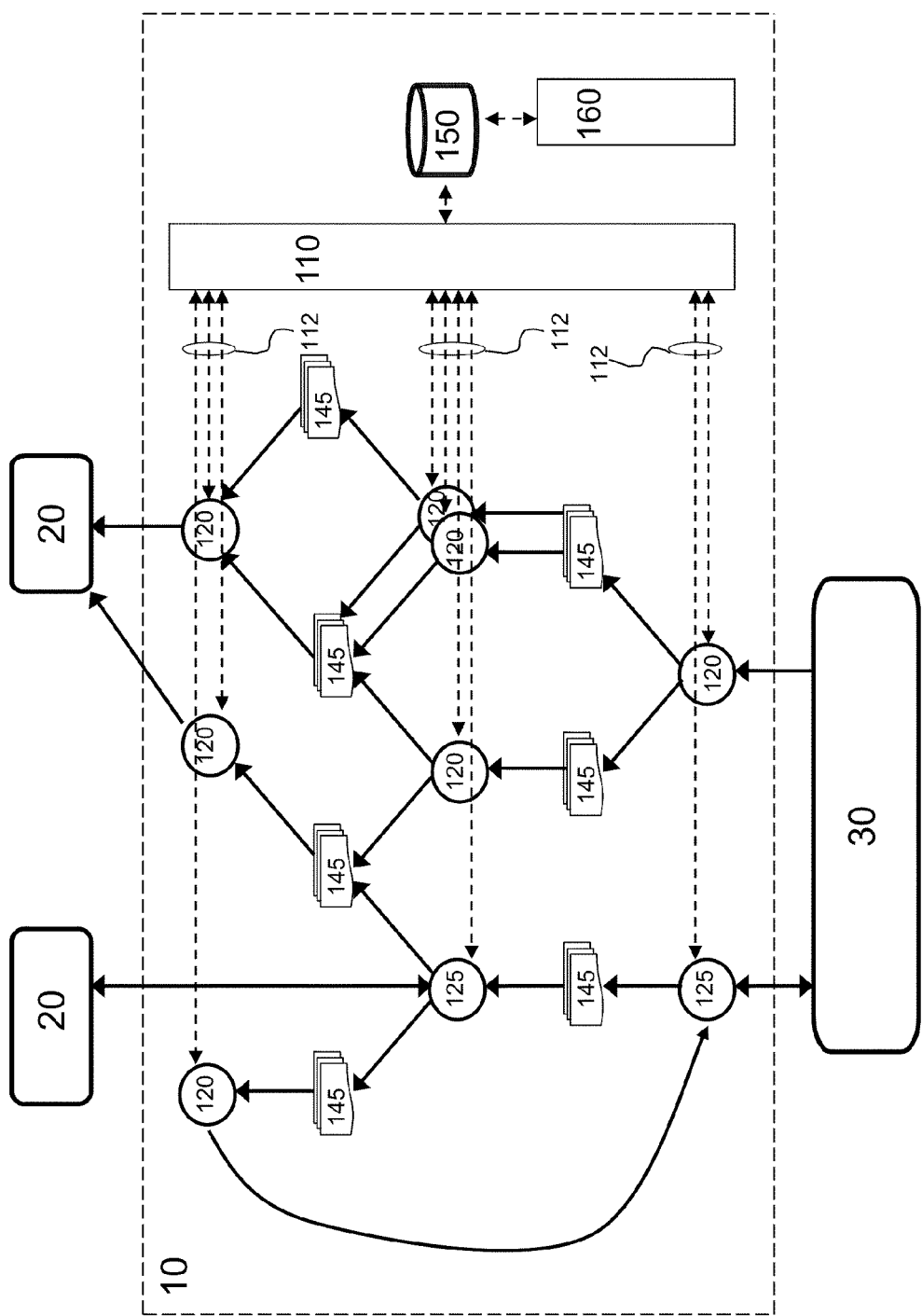
FIG. 4a presents a block diagram of managing and controlling a convergent mediation system according to an embodiment of the invention.

According to the embodiment, all processes are controlled 112 by process managers 110, which start up, monitor, stop and configure them when so instructed. This is presented in FIG. 4a. Managers 110 give configurations 112 to the processes during start-up. Once started, the processes can function independently from the manager, also in case the manager is temporarily unavailable.

The present architecture 18 is an "always on" architecture, wherein, in the best case, all the processes are doing work simultaneously.

Node 120, 125

Figure 4B:
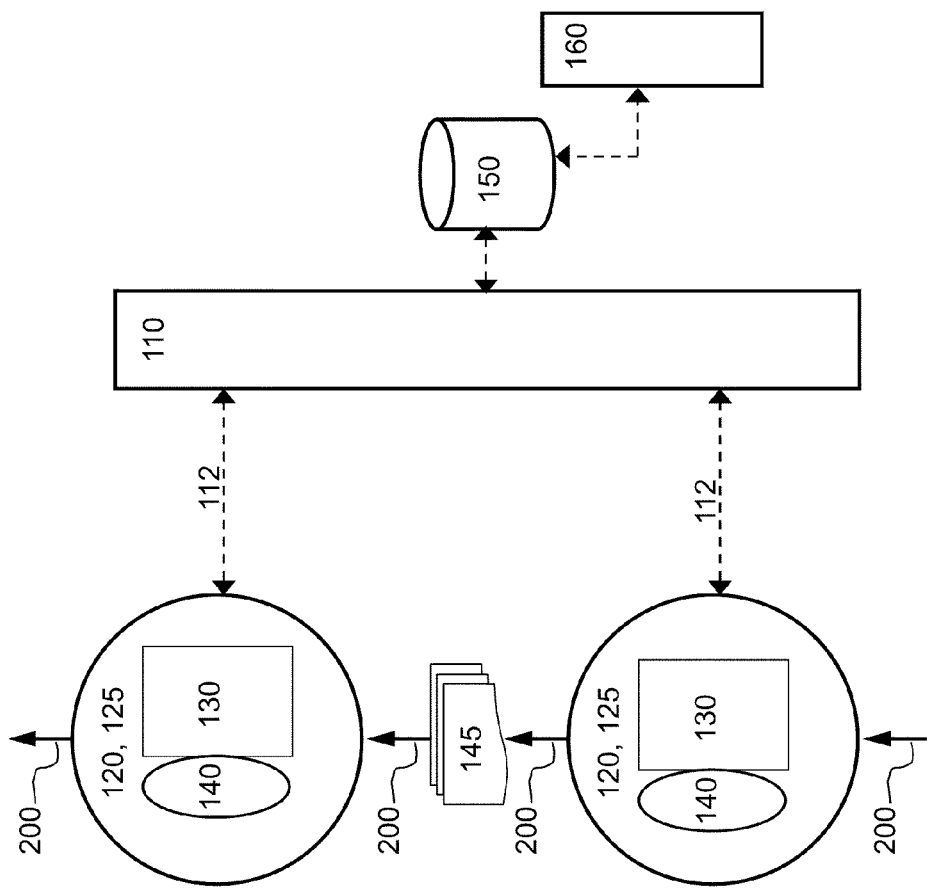

Nodes 120, 125 are functional components specialised in different mediation processes 16, such as balance check, cost control, collection, aggregation, pre-delivery control, validation, correlation and formatting, or a combination of these. Nodes are linked together to form processing streams for handling data items, such as event records and service requests. Each stream 200, both online mediation stream 212 and off-line mediation stream 214, is fully configurable through the web user-interface of the mediation solution according to the embodiment. FIG. 4b presents the nodes and their interaction in the system 10 in more detail. A node 120, 125 comprises its basic functionality in a node base 130, which is used for transferring data between the nodes 120, 125 in system's internal format. In addition, the node 120, 125 comprises a node application 140 that performs the actual usage data processing.

Nodes 120 run independently of each other. This means that even if one of them is temporarily unavailable, the other nodes continue as before. This, in addition to their independence from the manager 110, adds to the reliability of the system. Also, any data that cannot be transferred from one node to another, due to for example a network failure, is buffered 145. Buffers 145 are file, socket or memory based solutions. In a typical embodiment of the invention, the online processing streams 212 comprise memory-based buffers 145 due to the nature of online processing 12 that requires very fast action. On the contrary, the typical off-line processing streams 214 use file or socket based buffers 145.

Node Manager 110

While nodes 120, 125 take care of the actual processing of the events, Node Manager 110 makes sure they function in a controlled way 112. Node Manager 110 configures 112 the nodes 120 into correct processing order, starts them up, monitors and stops them when so ordered. Before starting up a new node 120, Node Manager 110 retrieves its configuration information from the system database 150 and configures 112 the node 120. Since the node 120 itself contains the configuration, it is able to function properly even if Node Manager 110 and system database 150 are temporarily unavailable.

Some of the properties and features of the Node Manager 110 are:

Self-contained process

For multi-host distribution, an identical Node Manager 110 process is installed and operated in each host. There is no master process for controlling Node Managers 110.

The Node Managers 110 know their responsibilities from reading the database 150; they do not know anything of each other and do not need to communicate between themselves.

Node Manager 110 starts and stops 112 the processing streams 200 and nodes 120 according to the orders read from the database 150.

It monitors the nodes 120 and restarts 112 them in case of failure or lockup.

It reads the revenue assurance etc. reporting data files 112 and saves it into the database 150.

It automatically inserts file transferring processes when the processing crosses host boundaries.

It can optionally send any alarms with SNMP protocol to a configured network management system in case of problems in processing.

In an embodiment providing dynamical allocation of the host processing power for online processing 12 and off-line processing 14, this dynamical allocation may be performed by Node Managers 110. In this case, Node Managers 110 are provided with the relevant instructions and they may be each responsible for allocating the processing power of the host within which they are operating.

System Database

System database 150 stores node configuration, audit trail information as well as status information of nodes 120, streams 200 and Node Managers 110. Also orders for Node Managers 110 are stored within the system database 150.

Examples of Using an Embodiment of the Invention

Convergent Voice and Data Charging Solution

The convergent mediation system 10 provides mediation and charging functionality for all voice and data services for both prepaid and postpaid subscribers with one single solution. The solution is connected to network over both online and file based interfaces, irrespective of the technology used. It supports Diameter and IP interfaces, and also SS7 based signalling interfaces. Correlation, duplicate checking and other typical mediation functionalities are also available in the online charging side. When same modules are used for all aspects of the solution, roll out of services is smoother. For voice control, an embodiment of the invention can provide voice SCP if so required as part of Convergent Mediation Solution, fulfilling a truly convergent mediation solution.

Online Cost Control

Another use case example for the convergent mediation system 10 is Online Cost Control. It provides a prepaid like ability for postpaid subscribers to control their spenditure in telecom services. When there is control of usage also for postpaid users, subscribers manage their spending and service providers can ensure the credit worthiness of their subscribers. Different limits can be subscriber specific and they are easy to control and manage with the tools that the solution provides.

The solution enables operators and service providers to offer new and innovative service concepts like family and business concepts. For example, parents can control how much their children spend on telecom services while still paying their monthly bills as usual.

IP Prepaid

A third example of the convergent mediation system 10 is IP prepaid. In IP prepaid, all prepaid functionalities that are typically managed by IN switches are provided in an all IP environment that is based on the convergent mediation system. The solution has a convergent mediation layer that hides the different network technologies and environments from the rating and account functionalities. Then convergent rating and balance management functionalities provide all rating features that are needed in today's and tomorrow's rating requirements. Balance management holds the subscribers accounts, which they can top up by using an existing top-up mechanism. This way operators and service providers can extend their existing investment from their top-up mechanisms while extending the rating functionality that they have.

According to an embodiment of the invention, the subscription-based functions contain at least following aspects. Multiple MSISDNs are associated with a single subscription. Further, single subscription may access 0 . . . n services in 0 . . . n service domains. System supports activation of services (provisioning) to both all subscribers and to individual subscribers based on some predefined criteria. The system supports even removing of active services from subscriber's access both from all subscribers and individual subscribers based on some predefined criteria.

Another embodiment of the invention supports also following rating and charging related functions. System supports rating and charging based on time, destination, location, volume, bandwidth, access technology, quality or used value added service. System also supports sending information about chargeable events to operator accounting/billing system. Examples of these are:

a) immediately after event is completed b) at regular intervals c) before completing event.

Furthermore, the system supports flexible billing system that enables use of stored value cards, credit cards or other similar devices. System supports indication of the price/cost of the service. An example is Advise of Charge. Subscriber is able to make decision of acceptable charge either dynamically or based on personal profile settings. System supports rating and charging of subscriber that receives service event or call. Subscriber is able to accept the service dynamically or based on personal profile.

According to an embodiment of the invention, the system supports off-line rating and charging. This is typically collecting CDR files from the network elements. Further, the system supports online rating and charging. This is typically subscriber authorization, real-time charging and control of network resource usage. Even more, the system supports event based (stateless) charging functionality, such as MMS message sending, WAP page retrieval etc. The system supports also session based (stateful) charging functionality, such as GPRS usage.

IMS Mediation

IMS enables rich, conversational multimedia services delivered on a standard network infrastructure. In IMS, all network usage data is by default available in real-time. To charge effectively for IMS, the access (bearer) network data has to be collected and possibly correlated with IMS usage data.

Convergent Mediation Solution 10 offers an easy choice for charging of IMS services by off-the-shelf interfaces and highly configurable processing logic. Convergent Mediation implements both offline and online charging functions as specified by 3GPP. Implementation of new business logics with Convergent Mediation Solution as new services are rolled out offers the operator an ease on the service launch project, for time and cost to support the billing of the service.

In this example, a video sharing service is charged by collecting bearer data from GPRS network elements and service, and session data from IMS network elements. It is assumed that an operator bills subscribers monthly for 3G service usage. The invoicing of the subscriber is handled by the billing system, which receives all usage data from Convergent Mediation Solution 10. The underlying network architecture can serve both fixed line and mobile subscribers, as IMS can offer services to both types of access networks Convergent Mediation Solution 10 hides the technical implementation of charging from the billing system 20 by interfacing the network 30:

Convergent Mediation Solution interfaces the 3G and GPRS core network elements through its vendor-independent implementation of GTP' collection interface. Besides the SGSN and GGSN, this collector can be integrated also to other network elements that support GTP' protocol, such as Cisco CSG which can help with content billing. Accounting data can be received also via DIAMETER protocol.

Convergent Mediation Solution 10 collects usage data from IMS network elements 30, such as Call Session Control Function (CSCF), Media Gateways or Application Servers. In this case, Offline Mediation Solution can fulfil the 3GPP specification not only for the Charging Gateway function, but also for the Charging Data function, which interfaces IMS network elements over the 3GPP Diameter interface.

Typical functionality configured especially for IMS mediation in Convergent Mediation Solution is:

encoding of data from, for example, ASN.1 structures in GPRS duplicate checking of records collected combining of partial voice call records aggregation of PDP contexts This means the identification of the GPRS tickets belonging to the same PDP context and forming a single billable item for the billing cycle. Typically total bytes in and out and duration of the connection are summed together.

correlation of access records (GPRS) with session and service records (IMS)

formatting of attributes and CDR fields needed by the billing system from the usage data from the network Convergent Mediation Solution processes the usage data records in real-time, that is, as soon as the network elements trigger the records Reprocessing of records is very common in the mobile mediation, due to usage of lookup tables in the identification of the subscriber group or other details. As lookup tables might not always be synchronised with the information in the billing system, the records where the subscriber was not identified are rejected. After the lookup table update, the subscriber group is found and records are released to billing. Convergent Mediation solution also provides a record correction facility for more complex correction and reprocessing scenarios.

In the example above, the use case was based on collection. Similar type of functionality can be based also for online processing. In such scenario the service usage is authorised before the actual usage takes place. Authorisation can include prepaid balance check and subscription validity for the used services.

In addition to charging functionality, Convergent Mediation Solution 10 enables Policy Control for IMS and broadband services. Charging and policy control functionalities are closely tied together and the solution leverages the same platform for both and thus keeps the total cost of ownership low.

Mediation of VPN Service Usage

The most logical way to charge an ISP or a corporate user for the usage of broadband or VPN service is to bill based on consumption of bandwidth. However, without proper automation, tracking down and calculating the usage of a VPN or broadband service is complicated and time-consuming task.

An automated usage-based billing of broadband or VPN services gives additional revenue as well as unifies the billing process of the operator. This is realised by taking advantage of the flexible and extensive network interfacing and data processing capabilities of Convergent Mediation Solution.

In providing information for the rating process, Convergent Mediation Solution 10 is able to provide details of, for example, bandwidth usage, type of service, volume of traffic, and amount of connections. Because of this, it enables the rating process to apply several different types of discounting options that can be applied for each type of service as well as for the total provided service, in addition to any Service Level Agreement (SLA) discounting options.

In this example, the operator needs to bill a subscriber for the usage of an international VPN connection. The network is based on IP, and the VPN is based on MPLS. The operator expects to send a monthly bill via a corporate Customer Financial Management system.

The operator is selling two services with two different kinds of pricing models:

Bandwidth-usage billing

Direct charging of the customer based on its usage of the network either by total volumes used or through the 95-percentile calculation method.

Bucket plan based on data amount transferred

The service is charged based on a flat fee, but the flat fee has a limit to usage. For example, 3000 £ per month per 10 Mb/s connection, plus all usage exceeding total usage limit is charged based on price of 1£/GB.

Optionally, the rate used can be affected by the origin and destination of traffic, class of service and time or type of day.

Convergent Mediation Solution 10 receives usage records from routers of the VPN or broadband service and takes care of the following tasks:

Receiving packets from routers or other equipment in the network measuring the bandwidth usage occurs through real-time interfaces handling protocols such as Cisco Netflow or SNMP. The information collected is IP flow information, from which Convergent Mediation Solution fetches different parameters, for example, user, application, router interface, CoS, used bandwidth and in-net/off-net traffic separation.

Aggregating the IP flows together to represent usage records. The usage is aggregated together so that one record represents the session the end user was using. The record includes sums of bytes downloaded and uploaded.

Enriching the flow information to include time and date information and more detailed information for example about the customer and QoS. The enriched information enables several usage-based billing models. In this case, the price is based on:

customer profile (discount to a valued customer)

CoS (Platinum service)

used bandwidth (inbound and outbound traffic)

in-net traffic (cheaper in your own network)

time of day (cheaper outside office hours)

In addition to the edge routers, retrieving customer specific information from an external data source (for example, LDAP directory) and from an AAA server. This information is used to identify the user based on the IP address and to define the customer profile. This information is correlated to the service records from the routers.

Convergent Mediation Solution 10 can be distributed so that the collection and aggregation functions are near the edge routers and a centralised processing server is located at a data centre. Distribution might be required since routers produce a wealth of information, and the amount of data should be minimised close to network before sending it to the data centre.

An Example of Environment According to an Embodiment of the Invention

Convergent Charging Functions

Figure 5:
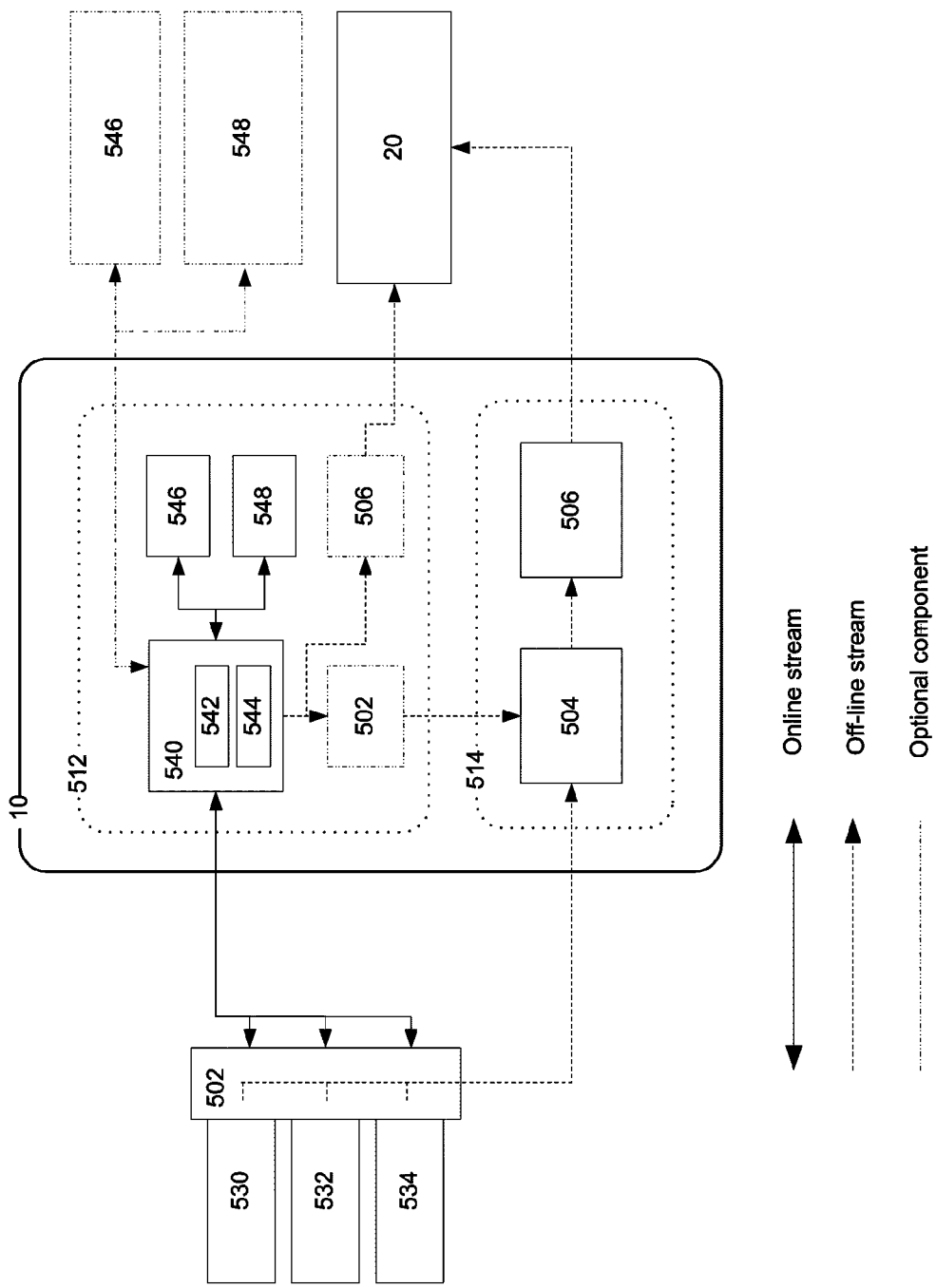
FIG. 5 presents a block diagram of an example of a convergent mediation system according to an embodiment of the invention.

According to an embodiment of the invention, an overview diagram in FIG. 5 shows a high-level view of the different charging (online and off-line) functions as described in the following.

The convergent mediation system 10 provides all the functions of the online 512 and offline 514 charging systems as well as functions to communicate between the different charging systems (mainly by generating records in the OCS that will be processed by the offline charging system).

Charging Trigger Function 502

The Charging Trigger Function (CTF) 502 generates charging events based on network resource usage concurrently with the resource usage. The different network resources can be anything from network/bearer level resources such as GPRS and PS gateways/switches (CN Domain) 530, MMS and WAP gateways (Service Elements) 532 or for example IMS resources (Subsystem) 534.

The difference between the online and off-line Charging Trigger Function 502 is that the off-line charging mechanism 514 does not effect the service usage in real-time. In online charging, the mechanism 512 has to provide functions to control the network resource usage in real-time.

Depending on the network resources that are generating the charging events, the information sent and the protocols that are used may differ between online and off-line charging functions. However, the following information may flow between the both charging systems and network resources that generate the charging events:

Charging events between Charging Trigger Function 502 and the off-line 514 (one-way stream) or online 512 charging (interactive stream) systems Acknowledgements for these events in online charging, the acknowledgment containing also information that is used to control network resource usage in real-time (for example grant or reject network resource usage request or authorization).

The protocols used to communicate between the systems support following capabilities:

Real-time transactions

Stateless (event-based charging) and statefull (session-based charging) mode of operation Reliable transportation of charging events (retransmission etc when running on unreliable transport system)

Changeover/Failover to secondary destination in case the primary charging system is not available Off-Line Charging System Charging Data Function 504

The Charging Data Function (CDF) 504 creates Charging Data Records (CDR) based on the charging events received from the Charging Trigger Function 502. The CDRs may be generated based on following conditions:

One charging event may result to one CDR i.e, a 1:1 relationship.

Multiple charging events may be used to create one CDR i.e, a n:1 relationship.

Typically one charging event can be used to create only one CDR. So, 1:n relationship between charging event and CDR is normally not in use.

Multiple charging events that are used to create a single CDR may be of multiple different types.

The CDF 504 should be capable of generating the CDRs near real-time (i.e less than one minute).

The CTF 502 and CDF 504 functions may be either integrated or they can be separated to different parts of the system 10. For example, multiple different types of Network Elements 530, 532, 534 may feed charging events to one CDF 504.

In a normal operating mode, all charging events used to build one CDR must originate from the same NE, i.e no cross-NE or cross-NE-Type correlation of charging events in CDF 504.

The resulting CDRs are in a well-defined content and format. The content and format of the CDRs depends upon the domain, service or subsystem in question.

Charging Gateway Function 506

The Charging Gateway Function (CGF) receives the CDRs generated by one or more Charging Data Function's. The Charging Gateway Function acts as a gateway between the network and the Billing Domain. Following list contains the main functions of the Charging Gateway Function:

Receiving CDR from CDF 504 in near-real time.

CDR pre-processing contains Validation, Consolidation and (Re-)Formatting of CDRs; CDR error handling and Persistent CDR storage.

CDR routing and filtering.

CDR file management.

CDR file transfer to Billing Domain.

CDR correlation (Note this is also defined in CTF 502)

CDR aggregation (Note this is also defined in CTF 502)

The interaction protocol between Charging Data Function 504 and Charging Gateway Function 506 supports:

Near real-time transactions.

Send one or more CDRs in a single request.

Changeover/Failover to secondary destinations.

Reliable transport of CDRs on an unreliable transport system.

The interaction between the Charging Gateway Function 506 and Billing Domain 20 is based on passing CDR files from system to another. A common standard secure file transfer protocol (e.g. SFTP) is used including the transport specified for the selected protocol.

CDR Transfer Between CDF 504 and CGF 506

If the Charging Data Function 504 and the Charging Gateway Function 506 are not integrated or are separate implementations, then the transport of CDRs between the functions are implemented by using e.g. the GTP' protocol.

If the functions are integrated, then it is possible to use some other (proprietary) protocol for communications between the functions.

CDR Processing 514

According to an embodiment of the invention, whether or not the Charging Data Function 504 and Charging Gateway Function 506 are integrated, the CDRs are passed between them in near real-time as soon as they have been closed by the Charging Data Function 504.

Once the CDRs have been received by the Charging Gateway Function 506 they undergo a semantic or syntactical analysis and based on the analysis the Charging Gateway Function 506 executes any of the following operations:

- CGF 506 replaces/fills erroneous parameter values with implementation specific 'replacement' indicators.
- Discards the CDR if found invalid (e.g CDR type missing or if CDR is corrupted). The CDRs that are rejected are properly logged and appropriate alarms are raised after which the erroneous CDRs can be destroyed. The number/statistics of lost CDRs are indicated in the CDR file written out by CGF. The CDRs that are rejected may be re-processed in the offline charging system 514.
- CDRs that are found valid are placed into a CDR file by the CGF 506.

According to an embodiment of the invention, the CDR processing complies with following requirements:

- All CDRs received by the CGF 506 are treated 'immediately'. The system is able to comply with near real-time requirements. In an embodiment, the system complies as closely as possible to real-time requirements.

CDR Routing

According to an embodiment of the invention, Charging Gateway Function 506 routes CDRs to different files that are kept open concurrently. The routing of the CDRs to different files can be based on different routing filters and those CDRs that don't match any routing filter are placed e.g. in the 'default' CDR file that collects all non-matching CDRs.

The routing of CDRs is based on CDR parameter information or the origin of the CDR. The file name contains indication of the used routing filter if possible.

According to an embodiment of the invention, Charging Gateway Function 506 implementation supports routing based on:

- Origin of the CDR
- Type of the CDR

The files may contain any combination of CDRs described in the following list:

- CDRs of single type
- CDRs of a specific set of types (e.g. only IMS CDRs)
- CDRs originated from a single CDF 504
- CDRs originated from a set of CDF's 504

Other implementations that the Charging Gateway Function 506 supports are:

- The configuration of maximum number of simultaneously open CDR files.
- The configuration of the routing filter evaluation order.
- The configuration of the CDR filters. It is assured that the routing filters do not overlap with each other.

Local CDR File Management

The system supports following ways of closing CDR files written by the CGF 506:

- A configurable file size limit.
- A configurable file closure time.
- A configurable file lifetime.
- A configurable number of CDRs within file.
- CDR release, version or encoding change.
- Manual O&M action.
- System defined reason (e.g. file system full).

When CDR file is closed, the next matching CDR is written to new CDR file that is 'next in the chain'. The exact time when the new CDR file is generated physically may be any time between:

- Immediately after closing the previous CDR file.
- When the next matching CDR arrives.

If there are no matching CDRs between the closure of the previous CDR file and configured file closure trigger time, then an empty CDR file is generated. After CDR file closing the file is immediately ready for transfer to the Billing Domain 20.

The CDR files from the Charging Gateway Function 506 may be removed in the following ways:

- By the Billing Domain 20 issuing corresponding commands provided by the FTP.
- By the CGF 506 after the file has been transferred.
- Due to file system storage limitations or configurable file age limits. The system should be managed in such a way that this will never happen.
- Manual O&M action File Transport and Protocol The file transport between Charging Gateway Function 506 and the Billing Domain 20 is implemented with two different mechanisms:

Basic File Transport Mechanism is supported by all CGF 506 implementations and complies with following requirements:

- The default protocol for CDR file transport is SFTP.
- The CDR files are transferred in either push or pull mode.
- File Transfer IRP can be used optionally. If File Transfer IRP is used it may comply with 3GPP TS 32.341, 3GPP TS 32.342, 3GPP TS 32.343 and 3GPP TS 32.344, for instance.

File Transfer Modes 508

According to an embodiment of the invention, files are transferred to Billing Domain 20 in push or pull modes or by using both modes at the same time.

In push mode, the CDR files from Charging Gateway Function 506 are written to the defined Billing Domain 20 file store at time/frequency controlled by the Charging Gateway Function 506. If the Charging Gateway 506 generates concurrent CDR files based on some routing filters, then it can send different files to different Billing Domains 20.

The file push from the CGF 506 is triggered by the following events:

- A (configured number of) new CDR file(s) has become available for transmission.
- The CDR file(s) has exceeded a configurable (total) size limit
- A configurable, regular time interval has elapsed.
- The CGF 506 file store utilization has exceeded a configurable level.

If the file transfer fails, the Charging Gateway Function 506 logs the event and raises an appropriate alarm.

In pull-mode transfer, the Billing Domain 20 reads the CDR files from the Charging Gateway Function 506 directories. The time/interval of the file transfer is controlled by the Billing Domain 20. The Billing Domain 20 requests files from the Charging Gateway Function 506 at any given time or frequency. If the file transfer fails, then any further actions are up to the Billing Domain 20. In this case, the Charging Gateway Function 506 also logs the event and raises appropriate alarms.

CDR File Format

The CDR file format follows the principles/standards described in the Charging Data Record (CDR) file format and transfer specification.

Online Charging System 512

Online Charging Function 540

The Online Charging Function (OCF) 540 consists of two distinct functions: Session Based Charging Function (SBCF) 542 and Event Based Charging Function (EBCF) 544.

The Session Based Charging Function 542 is responsible for charging of network/user session. For example voice calls, GPRS PDP contexts or IMS sessions.

The Event Based Charging Function 544 is responsible for event or content charging such as ring tone or logo downloads or other Value Added Service usage.

Rating Function 546

According to an embodiment of the invention, the Rating Function (RF) 546 determines the value of the network resource usage. Online Charging Function 540 passes the charging event in a form recognized by the Rating Function 546 and receives in return the rating output (monetary or non-monetary units). The Rating Function 546 may handle wide variety of rateable services, events etc.

Rating function 546 is implemented in three classes:

Class A, rating function calculates only the common prices or units of service.

Class B, rating function, in addition to common rating, also maintains subscriber specific counters.

Class C, rating function, in addition to common rating and maintaining counters, also maintains subscribers' accounts.

The class A rating function is stateless and class B and C are statefull. This means that the class B and C rating functions can do the value reservation of counters and accounts.

The class C rating function supports a mechanism for account balance management function towards external account management servers.

Depending on the class of the rating function it supports the following function before and/or after service consumption;

Determination of rating parameters of the tariff or the price and the payer and beneficiary of a chargeable event.

Price determination: calculation of monetary units (price) for a given number of non-monetary units;

Unit determination: calculation and reservation of a number of session-related non-monetary units (service units, data volume, time and events);

Tariff determination: determination of tariff information based on the subscribers contractual terms and service being requested.

Get/set counters applicable for rating with or without reservation.

Cross-product and cross-channel discounts, benefits and allowances.

Subscriber specific rating with and without counters.

Perform charging control and account balance checking on request basis for bearer, subscriber and events/services.

Subscriber account balance update (credit/debit) with or without reservation.

Rating function 546 supports the following properties in rating, balance management and charging:

Calculation can be based on amount of usage, time of event or session and other properties of event or session.

Common price and unit determination can occur in following ways: Continuous, stepped/tiered and flat/event summation; Relative to other price, e.g. discount or revenue share; Succeeding of non-succeeding validity periods; With and without tax.

Subscriber specific price and unit determination, in addition to common properties, can make use of the following: Dynamic values (counters and balance); One or more dynamic values at the same time; Monetary, usage and time unit values; One or more change threshold values; Time and value periods; Direction of counter is not the limiting factor; Maintenance fee.

Loyalty points can be stored or propagated to subscribers' dedicated or common account.

Subscriber balance management and charging determination can be performed by following ways: One or more accounts; Monetary, usage and time unit accounts; Zero, one or more blocking thresholds; Time and value periods; Direction of account is not the limiting factor; Application area of account can be limited by time, service, subscriber, origin, destination; Maintenance fee.

Rating function 546 supports the following interface methods:

PriceRequest: Determination of a price for the execution of a service or the delivery of a good. From the rating perspective this is the same method if run before delivery (e.g. for balance check or AoC), after delivery (post-rating for charging) or even later in a re-rating process. The same method applies for one-time or recurrent charges. The PriceRequest is used by the EBCF.

TariffRequestA: Determination of a tariff for a given service. This method is used, e.g., for voice calls, where e-parameters are returned by the Rating Function. Based on the tariff (e-parameters) the charging function calculates either the amount of units for a given price or the price for a given number of units. The method can also be used for various other services. The TariffRequest is used by the SBCF.

TariffRequestB: Determination of a tariff and price for a given session oriented service. This method is used, e.g., for voice calls, where e-parameters are returned by the Rating Function. At the beginning or during the session, the Rating Function receives requested service units and returns the tariff information (e-parameters). The charging function can grant the requested units or recalculate the granted units based on the returned tariff and the account balance. At the end of the session, the Rating Function returns the conclusive price of the consumed service. The method can also be used for various other services. The TariffRequest is used by the SBCF.

ServiceUsageRequest: This type of request, also called backward rating, determines the amount of units of a given service given the price. The ServiceUsageRequest is useful (but not limited) in the case where the subscriber's price plan is formed in usage per monetary units amount (e.g. 45 seconds per 100 Yen). Since the basic requirements are covered by the former requests, this request is optional.

Additional methods to maintain one or more subscriber counters (e.g. increase or decrease counter, set counter to the explicit value, set counter threshold, set expiry date)

Additional methods to maintain one or more subscriber accounts (e.g. increase or decrease balance, set balance to the explicit value, append balance, set balance threshold, set expiry date)

Upcoming and recurring notifications of counters and accounts based on their value and system time.

Input Parameters for Rating Function 546:
  Rating request type
  Service-specific data: Service-ID, Time/Date of Service usage, QoS, etc.
  Subscriber-specific static data: Subscriber-ID, Partner-ID (e.g. MVNO, merchant), additional tariff information (e.g. "Friends & Family" list), other static data.
  Subscriber specific dynamic data: Account Balances incl. units/currency (money, loyalty), Subscriber Counters (e.g. Service-Type (SMS/MMS/Volume/Time) used per time-unit (day/week/month/year), other dynamic data.

Output Parameters of Rating Function 546:
  Rating request type response: Price or Service units or Tariff incl. tariff switch information (e-parameters, Tariff Switch Time (absolute time/duration), etc.).
  Charge and recharge information: Value for subscriber accounts and counters (e.g. charge money, recharge loyalty accounts).
  Tax information.
  Detailed information to be used for invoice generation.
  Charging information per charging transaction.

Account Balance Management Function 548
  The Account Balance Management Function 548 is the location of the subscriber's account balance within the online mediation system 512.

CDR Generation for Online Subscribers
  In addition to basic Online Charging Functions 540 described above, the online mediation system 512 generates charging events to off-line mediation system 514 and act as Charging Trigger Function 502 for the system. The online mediation system 512 also includes Charging Gateway Function 506 as described above and generates CDR files for the Billing or Mediation Systems in the Billing Domain 20.

Charging Principles
  In general both off-line 514 and online 512 charging systems comply with following principles:
    In case the network resource usage can not be successfully completed/fulfilled the service can be given free of charge to the subscriber.
    The charging data generation and contents are flexible and unnecessary redundancy is avoided.
    Charging data is collected both on successful and selected unsuccessful resource usage attempts.

Off-Line Charging 514
  The purpose of off-line charging is to transform the charging information collected during the network resource usage to CDRs that are then further processed to the final billing information 'off-line' as in after the network resource usage has finished. The off-line charging does not impact the network resource usage in any way.

Event Based Charging in Off-Line Mediation
  In off-line charging the charging event is processed as described above. Even though there are no real-time requirements for any parts of the procedure, the system should be capable of completing the whole process from detection of chargeable event up to transferring of the CDR to Billing Domain 20 in near real-time.

Session Based Charging in Off-Line Mediation
  In off-line charging the session based charging is done by collecting the initial, interim and end charging requests by the Charging Data Function 504 which then upon completion of the network resource usage passes the corresponding CDR(s) forward to Charging Gateway Function 506. The system should complete the processing of the chargeable event as close to real-time as possible.

Online Charging 512
  The purpose of online charging is to perform credit control before the network usage is permitted. For this reason the prepaid subscriber account has to exist in the online mediation system 512 or external system so that the network usage can be billed before or during the network resource usage. All activities that are needed to assess the requested resource usage in monetary or other units and to debit these units from subscriber account must occur prior or during the resource usage. Depending on the situation the charging can be done in two different ways:
    Direct Debiting: When it can be guaranteed that the network is able to execute the requested network usage the requested network resource usage can be assessed and debited from the subscriber account immediately (e.g. sending SMS).
    Unit Reservation: When the online mediation system 512 can not know the amount of network resources that the end user may consume or when it can't be guaranteed that the network resource usage can be (completely) fulfilled it is possible to reserve a certain amount of (monetary or non-monetary) units from the subscriber's account. When the granted units have been used or new chargeable event occurs, the subscriber's account in the online mediation system 512 will receive a new unit reservation request. When the resource usage has ended, the actual amount of resource usage is returned by the Network Element and over-reserved units are returned to the subscriber account. This is done to assure that correct amount get debited from the subscriber account.

Event Based Charging in Online Mediation
  For online charging the event based charging must occur in real-time. Depending on the implementation of the service the charging may occur immediately or by reserving an amount of units from subscriber account and then debiting/returning the units after successful/failed delivery of service.
  In both cases the authorization of the charging event has to occur before delivering the service. The authorization may contain authorization for one or more chargeable event at a time.

Session Based Charging in Online Mediation
  In online charging the session based charging always involves reservation of units from the subscriber's account after successful authorization of the initial charging event. During the network resource usage, the Network Element is responsible of supervising the reserved unit/quota usage and of requesting additional interim charging events from the online mediation system 512 when needed or terminating the session. Once the session is terminated the Network Element reports the actual quota usage to the online mediation system 512 and the used/unused quota/units are debited/returned from/to the subscriber account.
  The whole procedure of receiving and responding to a session based charging event must occur in real-time. It also has to be noticed that one subscriber may have several concurrent services running on one user session at any given time.

Other Functions
Service Identification
  Service identification is a function identifying the service(s) which the request (e.g. CDR) represents. Identification is based on the parameters (i.e. fields' values) of the request.
  Service identification is based on predefined identification rules. The rules are logical expressions referring to one or several parameters. The rule can define identification values by fixed or dynamic values. Dynamic values can be a relation of two parameters or an external value e.g. from database. All value types can be used in the same identification rule. The final identification value can be formed from several values by an arithmetic statement.

The result of service identification must be unambiguously one service identifier (true) or unsuccessful identification (false). If the request represents more than one service, the identifier is the service group (product) identifier, which may include a list of detailed services of the request.

Correlation

In situations when several Network Elements generate charging events that are for the same event/session, correlation has to occur either in the Online Charging System or the Billing Domain. For example, IMS correlation functions are following:

IMS Charging Identifier (ICID)
Access Network Charging Identifier
Inter Operator Identifier
Application Charging Identifier (ACID)

These are presented in the standard specifications e.g. 3GPP TS 32.260.

Credit Pooling

When granting separate quotas it may be possible that the user's credit may be totally reserved when starting to use new services. The new service usage may then be denied even though the user still has credit left (but reserved to other services). To avoid this kind of fragmentation of credit it is possible to create a pool of quota/credit from which all services draw quota. The credit pool also holds service specific rating information so that it can define the amount of pooled quota/credit versus requested quota/credit. This can be done e.g. with Diameter or similar protocol.

Advice of Charge

The advice of charge functionality is designed to supply to mobile user information to allow real-time estimate to be made about the amount charged from the user. The advice of charge functionality can be used for example to following services:

Indicate that a monthly allowance has been exceeded.
Indicate the prize of the requested service.
Indicate services that are not included in the subscription fees.

These are presented in the standard specifications e.g. 3GPP TS 23.086 and 3GPP TS 22.024.

The embodiments mentioned above have also several common technological issues such as connectivity, platform functionality, scalability, high availability, and so on. The system supports both circuit and packet based protocols build on top of SS7, TCP, UDP and SCTP. There is also an easily extendable protocol framework that can be used to implement different service protocol adapters/parsers. Further, the system supports file based protocols. Depending on the protocol the system supports reading single line, multiline and structured records as well as single or multiple records from single file. According to an embodiment of the invention service protocols and I/O (network & file) protocol implementations are separated. In such an embodiment, it is possible to use same service protocol implementation with different I/O protocol implementations.

According to an embodiment of the invention the platform functionality of the system provide APIs (Application Program Interface) and tools for building, deploying, configuring, testing and running node applications 140. Furthermore, the system 10 provides APIs for communication between node applications; logging, browsing and management of log files; monitoring and for viewing monitoring information; and collecting and displaying statistics. Further, the system supports running node applications on different modes such as standalone, parallel, backup-primary setups distributed to different hosts. Also the system 10 supports task scheduling and Timer functions both on single node and on multiple replicated nodes 120, 125. According to an embodiment of the invention, the system provides APIs for sending alarms and notifications.

According to an embodiment of the invention, the horizontal scalability is gained with the aid of deploying processing on 1 . . . n servers. Furthermore, the system supports scalability by increasing the number of CPUs. The system supports also vertical scalability over 1 . . . n servers.

According to an embodiment of the invention, the system supports hot node application updates without system restart. This is useful when e.g. updating node application to new version. The system supports also rollbacks for business logic changes, runtime configurations and library updates. The system supports distributed session data management i.e. online data storage functionality. Furthermore, the system supports fast recovery on error situations. For example, automatic restarting of services when an error has occurred. The system supports a fail-safe operation mode, which is able to shutdown all unnecessary services and process only mission critical services. According to an embodiment of the invention, the system supports failover between nodes without loss of transactions. The system supports load balancer communication and automatic failover and node start-up and shutdown.

Overview of a Truly One Platform Architecture According to an Embodiment of the Invention Platform Functions Following chapters describe in more detail what different functions a truly convergent mediation platform 18 according to an embodiment provides to enable the implementation of the convergent charging functions as described earlier. The concept truly convergent mediation platform 18 refers to a system that has a single platform for both online 12 and off-line 14 mediation.

Overview

Figure 6:
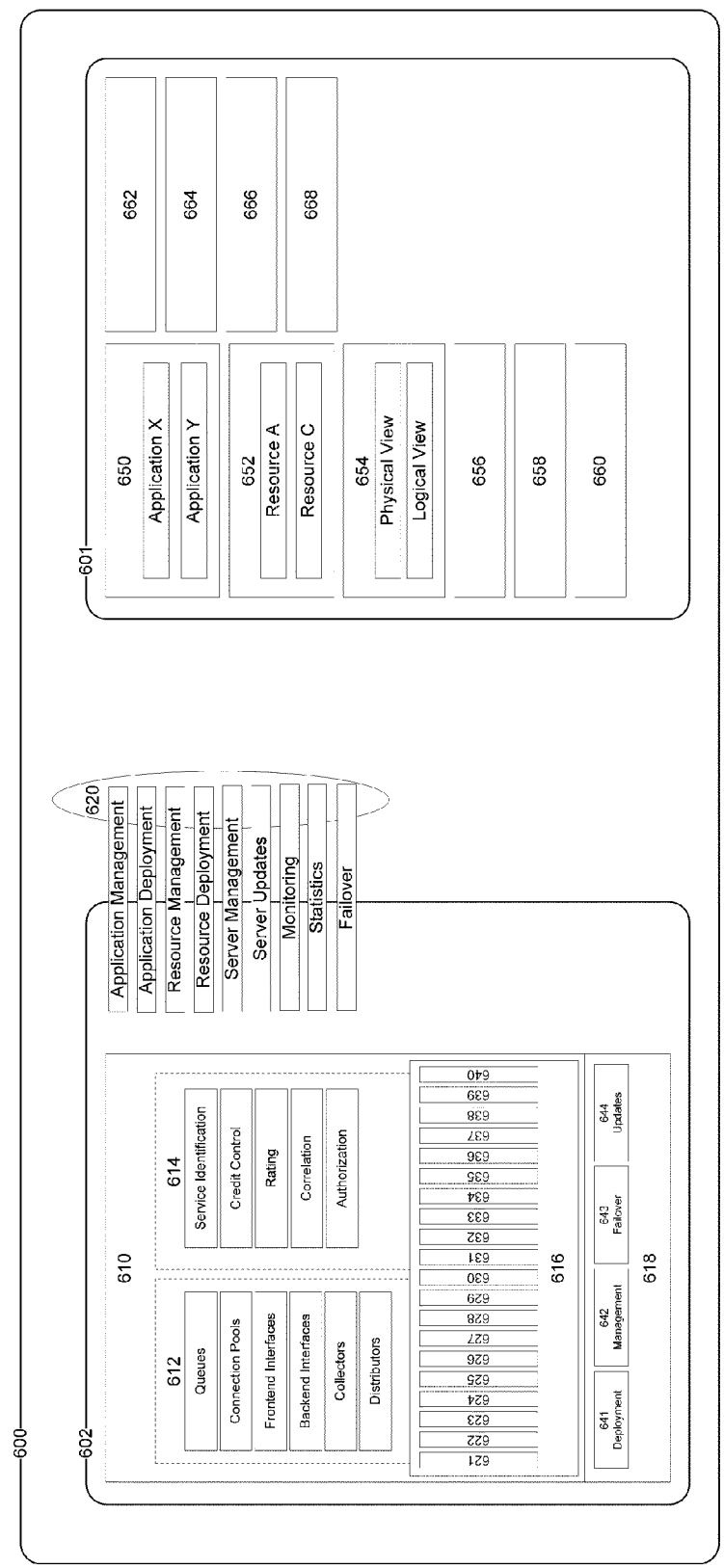
FIG. 6 presents a block diagram of a common platform of a convergent mediation system according to an embodiment of the invention.

FIG. 6 presents an embodiment of the invention with the different functions and services provided by different subsystems of the truly convergent mediation platform 600.

The truly convergent mediation platform 600 is divided into two main subsystems: the Management System 601 used to manage and configure different Platform, Application and Resource specific functions and the Transaction System 602 that is used to execute the Application logic. According to the embodiment, the convergent mediation system may include several Transaction Systems 602 running different or duplicated/parallel sets of Platform Applications and Resources. Different Transaction System 602 can be either chained one after another to form an Offline Charging stream or form a request-response type Business Logic Flow as required in Online Charging.

The Management System 601 is divided into different subviews according to different sub-systems that are being managed: User Management 662, Server/Platform Management 656, Application Management 650 and Resource Management 652. On top of the management functions the Management System 601 provides views for monitoring system functions 658, reporting 660 and audit trail functions 664.

Management System 601

Management System 601 is the single entry point for all installed Platform Applications. It contains views for all common services/functionalities and possibilities to add Application 614 or Resource 612 specific views to the system. According to an embodiment of the invention the Management System 601 is one example and implementation of a user interface 160 of the convergent mediation system 10. With the user interface an administrator can administrate simultaneously both online and off-line processing of data. Therefore, it is possible to configure and manage both online and off-line streams by means of a user interface 160. It is also possible to define business logics and rating rules for both of the processing types by a single operation or series of operations affecting both the online nodes and off-line processing nodes.

Application Management 650

Through Application Management 650 view user is able to do all Application management operations that are common to all Applications 614. These operations include:

- Listing all installed Applications 614
- Application 614 configuration and deployment to available Application Servers 610
- Starting and Stopping the Application 614
- Viewing Application's 614 basic information such as: Status, version, uptime, service availability; Deployment information both physical and logical views; System logs, alarms, event records; Basic monitoring information such as: CPU and memory usage, Disk usage, Transaction information.
- Updating Application's configuration information such as: Logging levels, File paths, Management port/address, Resource bindings such as: Database connection pools, queues, frontend & backend interfaces, distributors & collectors, etc.
- Entry to Application's custom management view (if applicable)

Resource Management 652

Resource Management 652 view is used to configure and deploy Resources 612 that can be used by any Platform Application that has been deployed to the same Application Server 610 with the Resource 612. It is able to do following actions through the Resource Management view:

- Listing all installed/available Resources 612
- Configuration and deployment of Resources 612 to available Application Servers 610
- Starting and stopping the Resource 612 (if applicable)
- Viewing Resource's 612 basic information such as: Status, version etc; Deployment information such as physical and logical views; Basic monitoring information such as transaction information.
- Updating Resource's configuration information such as thread counts, pool sizes, file paths, etc.
- Entry to Resource's custom management view (if applicable)

Server Management 656

Server Management 656 view is used to update and configure the Application Server 610 specific information. It is able to do following actions through the Server Management 656 view:

- Listing all available hosts (requires agent installation before host can be available)
- Listing all deployed Application Servers 610
- Configuration and deployment of Application Server 610 to available host(s)
- Starting and stopping Application Server 610
- Viewing Server's basic information such as: Status, version, uptime, availability; Deployment information such as physical and logical views; System logs, alarms, etc; Basic monitoring information such as Host and Application Server CPU memory and Disk usage
- Updating Application's configuration information such as Logging levels, File paths, Management port/address User Management 662

The User Management 662 view is used to update and configure User preferences and Application specific permissions.

Deployment 654

The Deployment 654 view consists of both physical and logical view of the different types of deployable components. For example it should be possible to view that on what physical hosts Application Servers 610 have been deployed and what different Resources 612 and Applications 614 are parts of some defined Service/Business Logic/Stream.

It shall be possible to do following actions through the Deployment view:

- List all different deployable and deployed components
- Deploy Application Server, Application or Resource
- View Application Server, Application and Resource deployment information such as physical and logical views and Service/Application/Business Logic/Stream view.

Runtime Monitoring 658 & Configuration 666

The Monitoring view 658 is used to access monitoring information of different Application Servers 610, Applications 614 and Resources 612. The view is used to configure different actions/operations that can be executed after some defined monitored levels have been reached. It shall be possible to do following actions through the Monitoring view 658:

- Listing all Monitored Objects (Hosts, Application Servers, Applications, Resource and other components that enable monitoring)
- Adding new Monitors to Monitored Objects
- Adding available Actions/Operations (Log, Alarm, Notify, Re-route, etc) that can be executed after defined threshold(s) have been exceeded
- Publishing monitoring data to statistics collection system Reporting 660

The Reporting 660 view is used to view transaction/event statistics and to create reports from the statistics data that is collected from the different Applications 614.

Audit Trail 664

The Audit Trail 664 view is used to view information about the management operations that are done to the convergent mediation platform 600, Application Servers 610 and Applications 614 by different users.

Transaction System 602

Transaction System 602 is the part of the convergent mediation platform 600 that is responsible for different functionalities that are required to deploy and run the defined Applications 614 and Resources 612. Transaction System 602 may be separated as many different processes depending on the functionalities that are required. For example, the Server Manager 618 and Application Server 610 may be two separate processes if required. According to an embodiment of the invention the Transaction System 602 is one example and implementation of a combination of nodes 120, 125 and system manager 110 of the convergent mediation system 10.

Application Server 610

The Application Server 610 is the component that loads the different Resources 612 and Applications 614 based on the configuration. The Application Server 610 is responsible for providing the services that are required for running the Application 614 and Resources 612. The Application Server 610 also enables introducing/deploying Application 614 or Resource 612 specific external/in-house libraries and parameter files that are required during the execution of the component. According to an embodiment of the invention the Application Server 610 is one example and implementation of a node base functionality 130 of the convergent mediation system 10.

Applications 614

Applications 614 are the components that contain the application specific implementations of business execution logic. The Application 614 may be an implementation of a big and complex function such as Rating 546 or Account Balance Management 548 or it may be an implementation of a simple Charging Data Function 504 that collects data from Network Element 30, 530, 532, 534 and writes CDR files to the disk. The Application 614 implementations can be for example Service Identification, Credit Control, Rating, Correlation, Authorization, Validation, Aggregation, Formatting, etc.

Resources 612

Resources 612 are implementations of non-application specific functionalities that can be used by any Application 614 at any given time. The Resource 612 implementations can be for example Database Connection Pools, Queues, Interface implementations, Collectors, Distributors, etc.

Some Resources 612 may have restrictions in the way they are used or whether they can be accessed by one or many simultaneous Applications 614 at a time. It is the Application Servers 610 responsibility to verify that the configuration being deployed is valid. According to an embodiment of the invention a combination of Applications 614 and Resources 612 is one example and implementation of a node application 140 of the convergent mediation system 10.

Common Services 616

Common Services 616 is the set of APIs or services that implement the functionalities that are common to all Applications 614 and Resource 612 implementations. Depending on the service the service may be initiated from the Application 614 or Resource 612 side or the Application Server 610 may initiate service/information request towards the Applications 614 and Resources 612.

Scheduler 621

Scheduler 621 service is required to execute operations between pre-defined intervals or in pre-defined times. The Scheduler 621 service is able to function correctly (no duplicate operations, no missed operation) in a distributed environment and in situations when a failover has occurred and service requests have been re-routed to another Application instance due to a failure in the primary Application 614, Application Server 610 or host.

Timer 622

Timer 622 is a local service for executing operations between pre-defined intervals or in pre-defined times. Timer 622 is typically used for operations that are not supposed to be persistent or distributed.

Localization 623

The Localization 623 service is used to provide localized error and output messages to users.

Statistics 624

The Statistics 624 service is used to collect statistics data from the deployed Applications 614 and Resources 612 as well as from the Application Server 610 itself. The statistics data can be collected by an external tool such as the Management System 601, or the data can be stored and forwarded to external statistics repository for reporting and analysis purposes.

Configuration 625

The Configuration 625 service is used to load Application Server 610, Application 614 and Resource 612 specific configuration information from the configuration repository during the Application Server, Application or Resource startup.

The Configuration service also supports runtime configuration changes and notification of the changes to the interested components.

Other functions that the Configuration 625 service implements are:
- Simultaneous updates of the distributed (Services), Applications 614 and Resources 612 including prepare, commit, rollback functionality in all levels of the Configuration service 625
- Configuration export and import between different installation instances
- Configuration versioning
- Application Server 610/Application 614/Resource 612/context specific configuration extensions/customizations. This is for example Applications A and B are otherwise identical but use different Frontend Interface implementations.

Data Storage 626

The Data Storage 626 service is used to access the data repositories that have been configured to the Application Server 610. Notice that the access to the repositories is done by using shared Connection Pool Resources to avoid overloading the data repository connections/connection count.

The Data Storage 626 service implementation is database vendor or file system independent to enable more flexible solution.

Logging 627

The Logging 627 service is used by all sub-systems and components of the Convergent mediation platform 600. The Logging service 627 provides runtime configurability of the logging levels to all Applications 614 and Resources 612 separately so that you can configure different logging levels to each deployed component if necessary.

Error Handling 628

The Error Handling 628 service is used to unify the error processing and reporting mechanisms used in different components. The service enables reporting/indications of error situations to monitoring and alarm systems if required.

The Error Handling 628 service is also used to publish/introduce the troubleshooting information to the Management System 601 Troubleshooting 668 view.

Auditing 629

The Auditing 629 Service is used to record information about management operations that have been done to change systems state and/or configuration. The audit records are collected and stored in the audit repository for a defined time period to enable both troubleshooting and possible security checks.

Connectivity 630

The Connectivity 630 services are used by different Resource 612 implementations that provide either file or network I/O based communications between Applications 614 or between Applications 614 and Network Elements 30, 530, 532, 534 or Business Support Systems 20. The Connectivity 630 service is split to functional layers that can work independently of each other:
- The I/O layer provides functionalities for interfacing 40 with different network (TCP, UDP, SCTP), file transfer (FTP, etc), memory and file based communication protocols in a unified way 145.
- The Protocol layer 40 provides the service level protocol, such as Diameter and Parlay, parsing functionalities in a unified way. The Protocol layer 40 is responsible of converting the incoming request to an internal representation that is used in communication between the Resources 612 and Applications 614

The I/O layer and Protocol layer 40 implementation can be bound together based on the service configuration. It is also possible to add and remove I/O and/or Protocol implementations when services are running.

Alarms 631

The Alarm 631 service is used to send alarms or runtime notifications to systems that have been configured to receive them.

Notifications 632

The Notification 632 service can be considered as a subset of Alarm 631 service and as such does not provide any additional functionality.

This functionality should not be confused with the notifications that are sent to the users for example from the Account Balance Management Function 548 when the balance of the account has gone under some pre-defined threshold.

Authorization 633

The Authorization 633 service is used to ensure that user executing the operations has sufficient privileges to do so. The level of Authorization 633 depends upon the security requirements of the Application 614.

Transactions 634

The Transaction 634 services provide tools for creating transaction information and provide means to define transaction boundaries. The transaction management functionalities in this context are not as comprehensive as is for example in the database applications and provide tools only for creating unique transaction ids' and for creating start, interim and end timestamp information for the transaction.

The Transaction 634 service also provides statistics data that can be collected by the Statistics services if/when required.

Monitoring 635

The Monitoring 635 service provides the runtime interface for accessing the Application Server 610, Application 614 and Resource 612 monitoring information that has been made available by the implementations. The Monitoring 635 service provides tools and interfaces for:

Registering new Monitored Objects to Monitoring Agent/Manager
  Adding Monitors to Monitored Object's 'exposed' attributes
  Binding operations/actions to the defined Monitor thresholds
  Publishing/exposing the monitoring information and management operations to Management System 601

Heartbeat 636

The Heartbeat 636 service is used retrieve information about the Application Server 610 and the Application 614 status. The information can be used to initiate failover/switchover during planned downtime/update or an Application Server 610, Application 614 or Resource 612 failure.

Runtime Management 637

The Runtime Management 637 service provides access to the management operations that are exposed by the implementations. The operations can be executed through the Management System 601 or they can be accessed using a standalone command line tool(s). The operations that can be managed through the Runtime Management 637 are:

Starting and Stopping Resources 612, Applications 614 and Application Servers 610
  Updating runtime configuration such as logging levels and other exposed parameters
  Executing exposed operations/actions Messaging 638

The Messaging 638 service is used by different Resources 612 and Application 614 when communicating within the same Application Server 610. The service enables finding and routing of the messages between the different components.

Event Records 639

Lookup 640

Server Manager 618

The Server Manager 618 provides services for updating and managing the Application Server 610 instance that it manages. The manager 618 can be used to deploy new libraries to the Application Server 610 and to initiate failover if required.

Deployment 641

The Deployment 641 service is used when uploading new Resource 612 or Application 614 library versions to the Application Server 610. The loading of the libraries is done by the Application Server 610 based on the defined configuration but the physical deployment and storage of the libraries to the disk is done by the Server Manager 618.

Management 642

The Management 642 service is used to start and stop the Application Server 610 remotely if required. The Management 642 services can also be used to view and update the Application Server's 610 local configuration and log files.

Failover 643

The Failover 643 service is used to either initiate failover functions on the local host or to acknowledge the 'other' configured host in the configured failover cluster that this managed Application Server 610 is unable to continue service and that the backup host(s) have to initialize required failover functions locally.

Updates 644

The Update 644 service is used when updating/patching either the Application Server 610 libraries or the Server Manager's 618 libraries. The purpose of the Update 644 service is to provide all the required functions that are needed so that all system update operations can be done remotely 620 from the Management System 601.

Management Interfaces 620

Management Interfaces 620 are the interfaces that can be accessed either from the Management System 601 or the local command line management tool. Depending on the security requirements of the system the Management Interfaces 620 may require authentication before they can be accessed. The authentication is done using the same service as in the Management System 601.

Examples of Distributing Services, Resources and Applications According to an Embodiment of the Invention In order to flexibly implement different convergent mediation services, the system supports different kinds of Application and/or Service distribution schemes. In this context, a service is for example a GPRS charging service that includes different convergent charging applications 16 such as Service Identification, Credit Control and Rating. An Application is a standalone implementation of some convergent charging function as mentioned above.

Standalone Application

Figure 7:
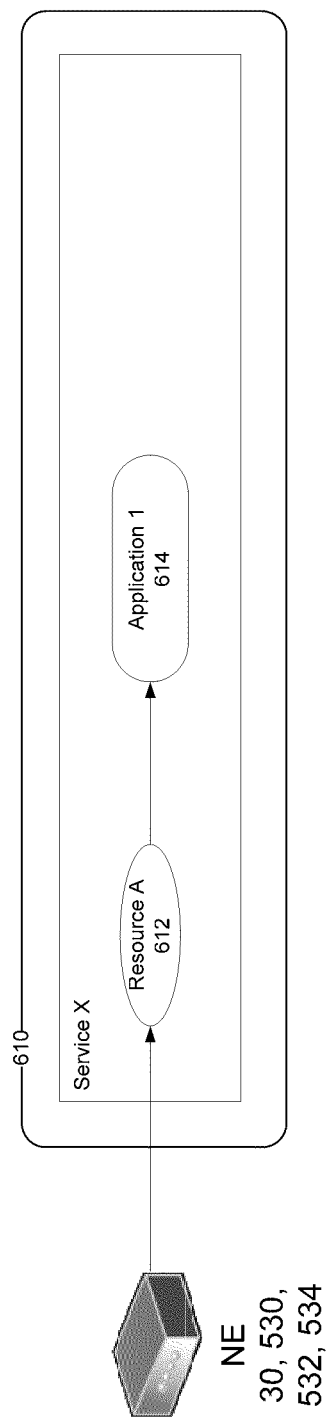
FIG. 7 presents a block diagram of an example of using application servers according to an embodiment of the invention.

A standalone application is, for example, an installation that consists of one Application 614 (Application 1) running in one Application Server 610 instance. Simplest type of Application 614 would not even require any Resources 612 and would only provide functionality that can be used through the Management Interfaces 620. FIG. 7 presents an example of Service X that is implemented with one Resource 612 (Resource A) that provides the connection between the Network Element NE 30, 530, 532, 534 and the Application 614 (Application 1). This could represent a simple Collection Application that just writes the collected data to disk for backup or further processing.

Figure 8:
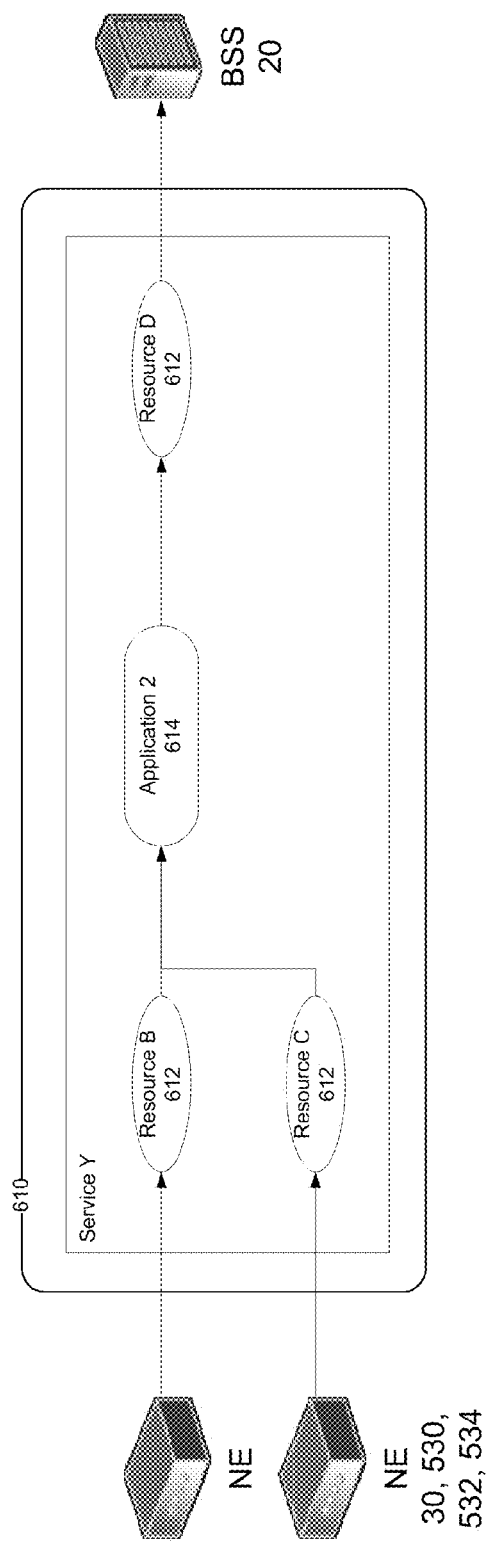
FIG. 8 presents a block diagram of another example of using application servers according to an embodiment of the invention.

FIG. 8 presents another example (Service Y) of a Standalone Application. In this example there is a basic Mediation Application receiving or collecting data from a number of different Network Elements and forwarding the data to a backend system such as billing or prepaid system. As well as in previous example Resources B and C provide the connections between the Network Element NE 30, 530, 532, 534 and the Application 2 and Resource D provides the connection between the Application 2 and the BSS 20.

Interoperable Applications

The Application Server 610 is able to run multiple different Application 614 instances that may use same resources 612 such as database connection pools etc. It is also able to run Applications that require services from Applications that are running on the same Application Server 610.

Figure 9:
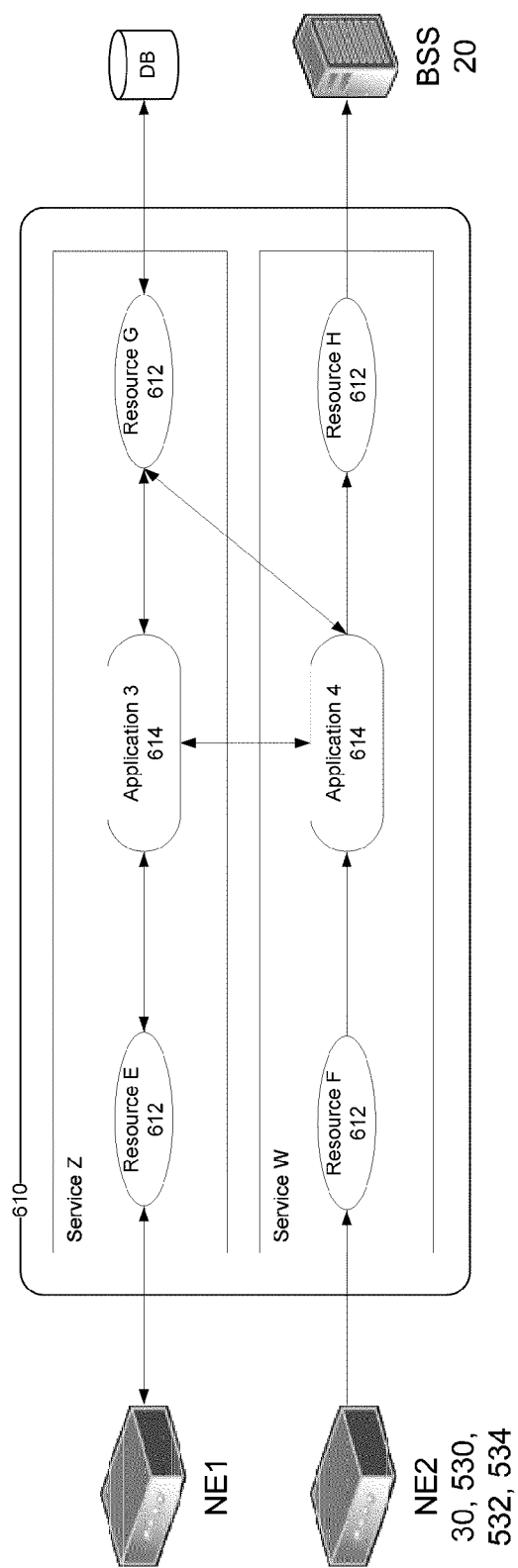
FIG. 9 presents a block diagram of another example of using application servers according to an embodiment of the invention.

FIG. 9 presents an example of interoperable application using both online and offline mediation streams. In this example there is a pre-paid service (Service Z) bundled with an access monitoring (Service W). The Service Z includes rating, balance check and crediting from subscriber's prepaid account which is located in a database DB. The rating needs also information from access monitoring Service W. Rating and balance check and crediting are made together with Applications 3 and 4. Resource E provides the interoperable (two-way) connection between the Network Element NE1 and Application 3. Further, Resource G provides the interoperable (two-way) connections between the Application 3 and Application 4 and database DB. Resource F provides the connection between the Network Element NE2 and the Application 4 and Resource H provides the connection between the Application 4 and the BSS 20.

Distributed/Parallel Applications

Figure 10:
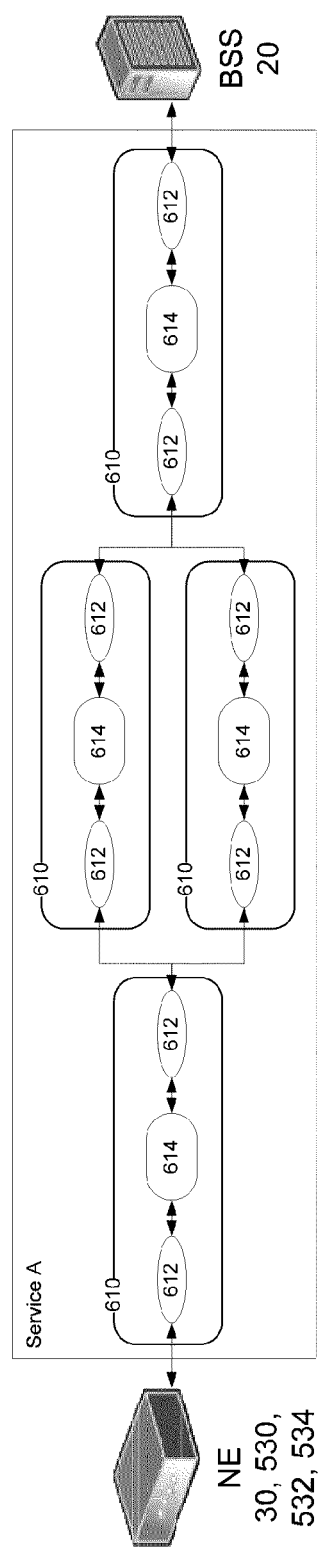
FIG. 10 presents a block diagram of an example of using application servers defining a service according to an embodiment of the invention.

FIG. 10 presents an example of Service A, which needs interoperable application servers and distributed functionality. The business logic or the processing stream of the Service A can be distributed to several different Applications running on different Application Server instances that are running on different hosts. The different Applications may be running in parallel when more processing power is required (for example Rating Function) or the whole Service may be distributed for High Availability reasons. If the Applications running parallel require storing of some state of the Transactions then the Applications use replicated data storage to enable dynamic/service specific load balancing between the parallel Applications.

High Availability

Figure 11:
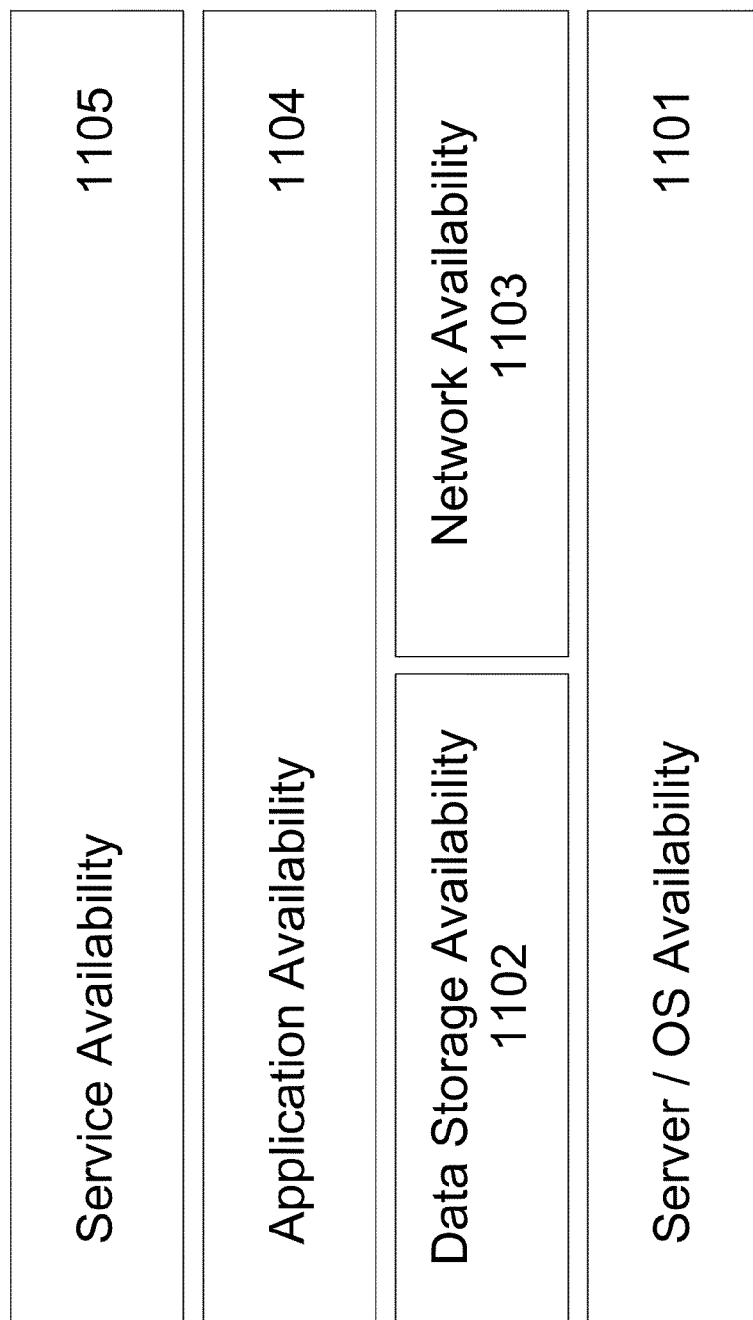
FIG. 11 presents a block diagram of layers contributing to high availability according to an embodiment of the invention.

According to an embodiment of the invention the High Availability issue is addressed on many levels of the business logic execution environment. FIG. 11 presents different layers that contribute to the overall availability of the system according to the embodiment. Different aspects of High availability are hardware availability, hardware clustering and failover 1101, data storage availability 1102, network availability 1103, Application availability 1104 and Service availability 1105. In this context the Service availability 1105 is the key issue and the goal is to make Services available up to 99.999% of the time.

The Service Availability 1105 can be thought from the end user point of view for example so that when making a call, the call can be made even if the charging of the call is not done online because of some business support system failure. So the service is up and running even though some parts of the whole rating and/or billing chain or business logic are not functioning. The level of Service Availability 1105 and the strategies how to cope with different error situations depend on what the situation is. The customer must be able to configure the system so that they can guarantee the agreed level of service availability in all situations.

The convergent mediation platform is able to implement convergent charging applications that allow the system to function during planned or unplanned network, hardware and software downtimes in a well designed and predictable manner.

It is also possible to prioritize the services and/or parts of the system that are even more highly available. For example, the system may be configured such that in case of failure (database corruption, hardware failure, . . . ) or disaster (earthquake, flood, . . . ) all emergency/selected authority (police, army, . . . ) calls are connected in all situations and all other non-emergency calls and services are dropped.

Application Distribution

Figure 12:
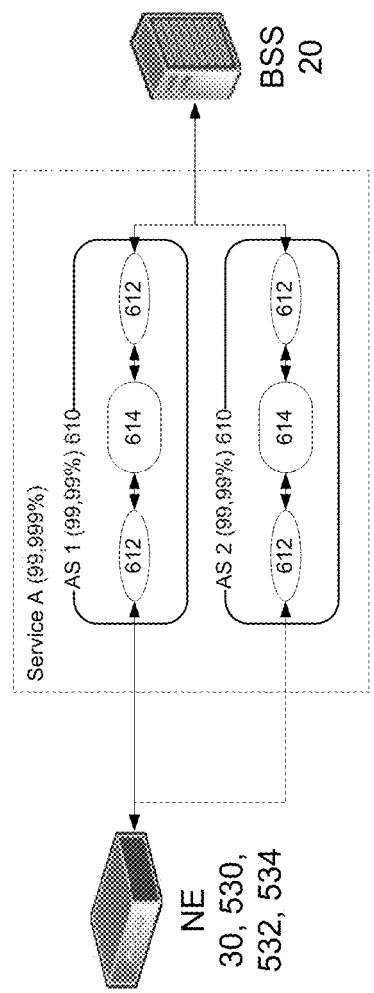
FIG. 12 presents a block diagram of an example of increasing availability according to an embodiment of the invention.
Figure 13:
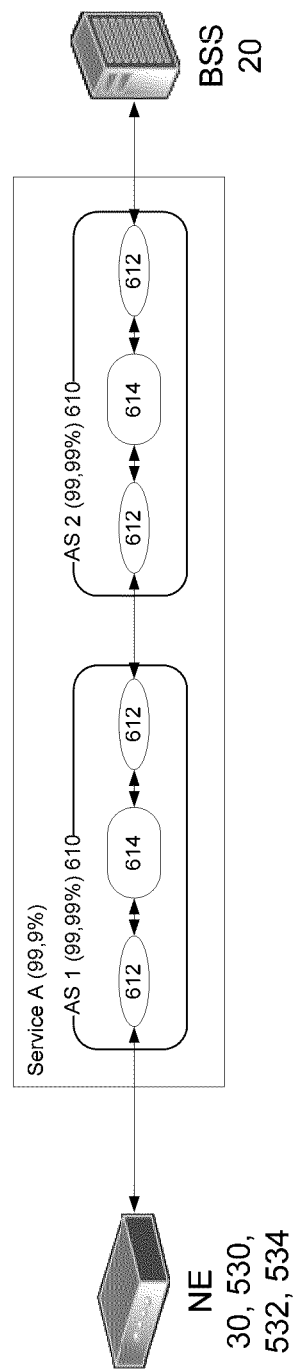
FIG. 13 presents a block diagram of an example of decreasing availability according to an embodiment of the invention.

The distribution of the convergent charging applications and logical functions also contribute to High Availability. FIGS. 12 and 13 highlight the ideas and effects of different availability issues as an example. As described in FIG. 12, the service availability can be increased by adding distributed Application Servers (preferably on dedicated hosts) and by introducing a load balancing or failover mechanism to Network Element that can automatically re-route the request from AS 1 to AS 2 in case of failure.

FIG. 13 shows the effects of chaining different Applications and how the availability of the overall service may change.

Failover

Failover is the term used about the situation when the Network Element 30, 530, 532, 534 or load balancer detects that a primary server or application is not available and re-routes the service requests to a secondary server.

The failover time depends on the High Availability configuration of the system and/or how long it takes for the secondary server to be able to service the requests send from the Network Element.

Recovery Times

Recovery time is closely related to high availability. Recovery time is the total time required for a planned outage or the time required to fully recover from an unplanned outage.

The recovery time of the system depends upon many different factors, such as:

Hardware recovery and start-up time

Data storage size and recovery time

Application recovery time

The convergent mediation platform enables implementation of Convergent Charging Application that can minimize the expected recovery time by cutting down the amount dependencies to systems such as database, for example.

The Convergent mediation platform enables implementation of such Convergent Charging Applications that minimize the amount of lost data in case of failure in the network, hardware or the software components. The Convergent mediation platform provides tools for maximizing the data availability when needed.

It should be noted that the data availability and the service availability (from end users perspective) are different issues. Maximum data availability of an Application (e.g minimizing the amount of lost data in all cases) may also be ensured in the expense of service availability if so required.

System Operation and Data Processing Principles in an Embodiment

The system configuration is stored and maintained in the System Database 150. There is one Node Manager 110 installed in each host 100 and started as an independent process. The configurations are changed and the system managed via the User Interface 160.

Upon the system start-up, Node Managers 110 read the Processing Chain configurations from the system database 150 and start up the Processing Chains. A Processing Chain 200 includes a plurality of Nodes 120, 125. Each of the system components executes independently once started. The Processing Chains 200 process the data until they are shut down. The Node Manager 110 shuts down the Processing Chains 200 or Nodes 120, 125 upon user's request.

The usage data flows between the Nodes 120, 125 in internal data files or other data format used in disk based, socket based or shared memory transport. When using disk based buffers, each Node checks its input data sources constantly for new data files. When a new data file is detected, it is immediately processed and delivered to the output destinations. Usage data is processed file by file. When an input file is processed and the possible corresponding output data file is created, the input file is removed. This way no data is lost if a Node 120, 125 crashes during data processing. Each Node locks the input file it is reading. This way no other Node can erroneously read the same file. A corresponding mechanism is used in shared memory and socket based buffers.

At a crash recovery the Node will start writing to the beginning of the existing temporary data buffer. This ensures that no duplicate records are generated and no temporary data is left permanently in the buffer or cause memory leaks.

If a Processing Chain 200 is distributed to several hosts, the system 10 will automatically take care of usage data transmission between hosts. This is done by an application that is divided into the sender and receiver processes, which reside in the separate hosts.

There is a mechanism for discarding usage data that is identified to be invalid by the usage data processing logic. It is possible to feed the invalid usage data back to the data processing chain.

System Monitoring According to an Embodiment

The Node Manager 110 constantly monitors the status of the nodes 120, 125, and:

If a Node has crashed the Node Manager will start it up again

If a Node has frozen the Node Manager will kill and restart it

Restarting is tried a few times. If the first restart does not succeed, the current block of input records for the Node is discarded as faulty data to a storage directory, and the processing continues from the next record block in the queue.

Node Managers can send SNMP traps to inform Network Management System about the statuses of the Nodes and possible problems such as low disk space, database and network connection trouble. The status information is also stored to the System Database from where the information is collected and shown in the User Interface.

Node Applications According to an Embodiment of the Invention

Different types of Node Applications 140 that are responsible of the usage data processing are listed in this chapter. Some of the Node Applications are common for most of the product installations and some are customer specific.

Online Interface Node (Interactive Interfaces) 125

Online Interface Nodes 125 receive data that needs online processing 12. These are, for example, checking a balance of a user or checking whether the user is authorized to get the requested service. Online Interface Nodes 125 also handle a process of answering to the network element.

Figure 14:
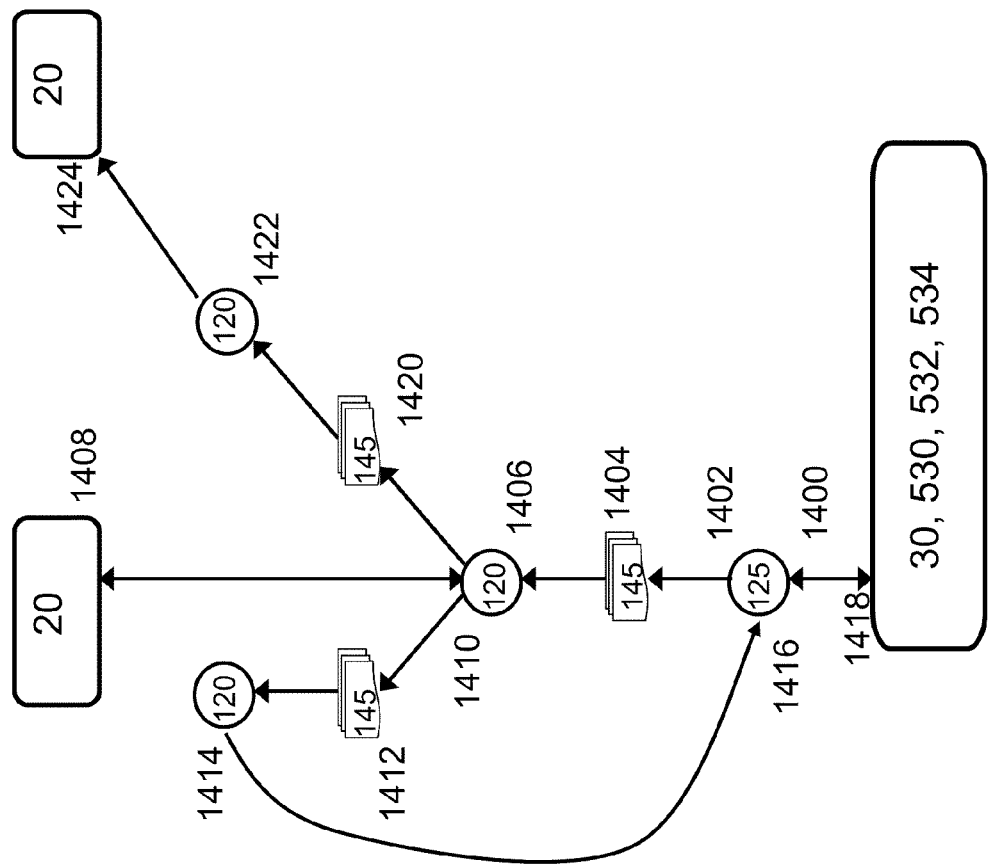
FIG. 14 presents a flow diagram of a process according to an embodiment of the invention.
Figure 15:
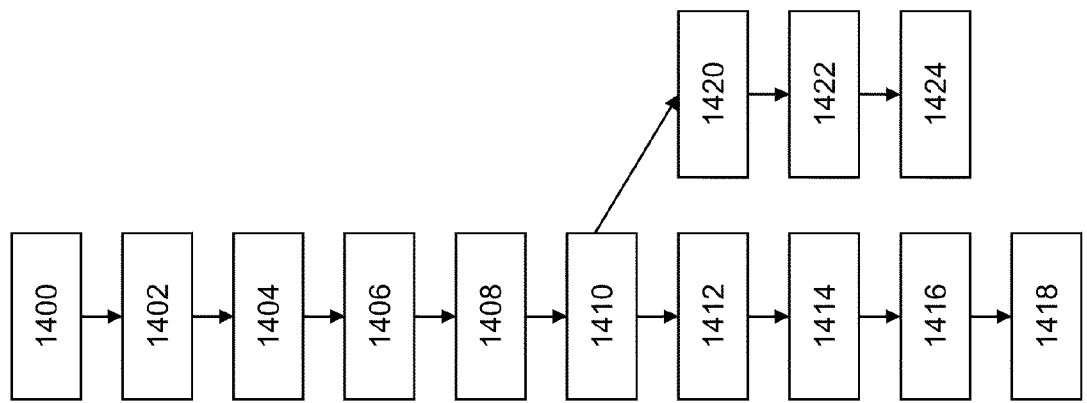
FIG. 15 presents another flow diagram of the process of FIG. 14.

FIGS. 14 and 15 describe an example of a convergent mediation flow using both online and off-line mediation processes. The process starts on a request 1400 from a network element. The request is identified as a service request of a subscriber who must be charged and authorized before the subscriber gets the service. The request is received by an online interface node 125. In 1402, the online interface node 125 transmits the request immediately to a processing node via a buffered transport layer 1404. In 1406, the processing node makes a balance check for the subscriber's account and in 1408 debits or reserves money needed to the service. The result of the check (enough money in the account or not) is returned to a processing node in 1410. The processing node sends the result to a decoder node 1414 via a buffer 1412. In 1416, the decoder transmits the result to the online interface node 125, which converts the result for the network element by accepting or denying 1418 the request, depending on the result of the check and the service ordered by the subscriber. Meanwhile the processing node also keeps a book on all events in the mediation system. In 1420, the processing node makes an event record or CDR for off-line mediation via a buffer. In 1422, a distributor node sends the event record or CDR to a billing system for further use e.g. invoicing or statistics etc.

In an embodiment of the invention, the buffers in phases 1404 and 1412, i.e. in online mediation streams, are memory based, i.e. random access memory. The memory-based buffers have strong availability and low latency. It should be noted that the memory-based buffers can be used also in off-line mediation streams.

Data Collection & Data Parsing (Input Interfaces) 120

Collector Nodes collect usage data either as files or through a real-time protocol. There are generic Collectors and Network Element specific Collectors.

Collector Nodes parse the usage data collected. It is possible to define rules how data is parsed in the application configuration. A typical Collector converts the usage data into internal format for the next Node in the Processing Chain. It is also possible that the Collector Node is the only Node in the Processing Chain: in this case the Node collects, parses, processes and delivers the usage data. An example of this is a Node that acts as a protocol converter.

Data Processing 120

Standard data processing functionality includes:
Data validation and filtering
Data manipulation and splitting
Data duplication
Data generation (for example header/trailer records)
Lookup mechanism for receiving information from external sources
Data Aggregation/Correlation
Record duplicate/sequence checking
Authentication and authorisation
Balance update, check
Pre-delivery control When Node Application operates based on the internal data format, no data parsing and formatting functionality is needed. The Node Application receives data record by record from the internal data transmission mechanism.

Correlation may use external record storage for intermediate records. The correlation function is able to read records from multiple sources.

Data Distribution and Data Encoding (Output Interfaces) 120

Distribution Nodes deliver usage data either as files or through a real-time protocol record per record. There are generic Distribution Nodes and Business Support System specific Distribution Nodes.

The Delivery Nodes encode the data to the format the interfaced OSS/BSS requires. For file-based delivery, file-naming functionality is available. In case of file/batch type delivery, it is possible to schedule the delivery application.

Figure 16:
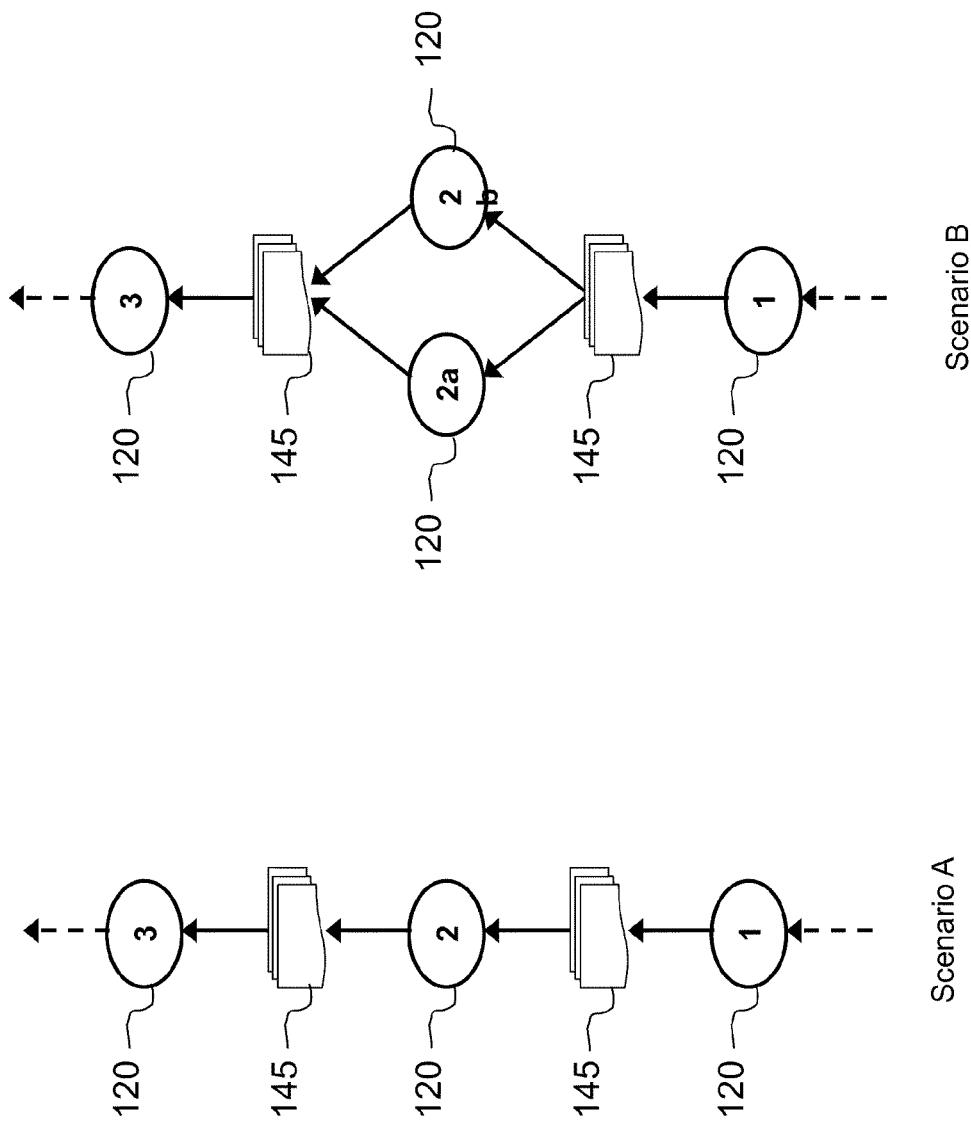
FIG. 16 presents a block diagram of multiplying a convergent mediation process according to an embodiment of the invention.

Increasing Throughput by Multiplying Mediation Processes According to an Embodiment of the Invention In case of insufficient processing capacity of a mediation function or functions within a processing stream, an embodiment starts up an identical copy of the node in question to scale up the processing capacity of the system. FIG. 16 shows an example, in which the node 2 has insufficient performance in scenario A. In scenario B, the node 2 has been duplicated to run in nodes 2a and 2b, which are running in parallel and sharing workload between them. Because the embodiment uses buffers 145 between the consecutive nodes 120, the parallel nodes 2a and 2b can use the same buffers 145 from which to read and to which to write the processed data items, such as event records. In such an arrangement, the preceding node 1 need not be modified when duplicating node 2, as node 1 can continue writing its output to the one and same buffer 145. In a corresponding manner, node 3 can read from the same buffer 145 regardless of the number of nodes 2 that write to the buffer 145.

Figure 17:
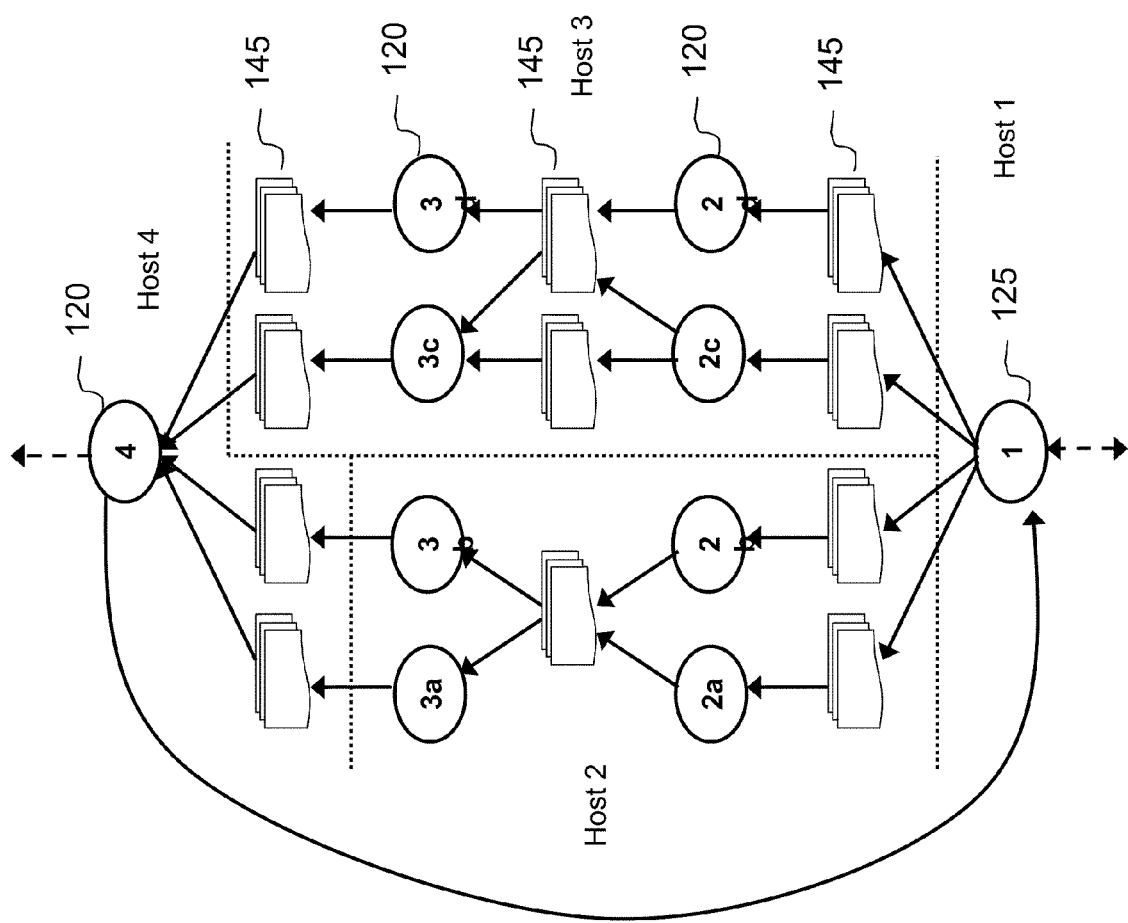
FIG. 17 presents another block diagram of multiplying convergent mediation processes according to an embodiment of the invention.

If the processing capacity of a single host is the bottleneck, the sharing of the workload can be done between hosts. FIG. 17 describes an embodiment, which is able to enhance processing capacity of the system in this way. In FIG. 17, nodes 2 and 3 have been multiplied into nodes 2a, 2b, 3a and 3b running in one host, and nodes 2c, 2d, 3c, 3d running in another host, all processing the event records or other data items in parallel. In online mediation process 12 the buffers 145 between the processing nodes 120, 125 (i.e. online interface node, processing node, encode, decode, etc.) are memory based.

The node duplication can also be used in dynamical allocation of the processing power of the system between online processing 12 and off-line processing 14. For example, the system 10 can duplicate an online stream 212 in case a latency time of the online processing 12 tends to increase. The duplicate stream 212 may then be removed if the amount of online processing 12 load decreases. Similarly, the number of parallel off-line streams 214 may be increased, for example, during times of low online processing 12 load, and thereby the throughput of the system 10 may be increased. The same principles apply also to host multiplication if the system 10 has an auxiliary host available.

Buffers 145 are placed between the nodes 120, 125 to ensure reliability of the mediation process. Reliability measures with the buffers 145 include a certain processing order of event records within the node 120, 125, outgoing buffer 145 and incoming buffer 145. In an embodiment, event records are stored within the buffers 145 as groups. Number of records in each group can dynamically vary during runtime from one record to any number of records, as long as there is free storage space available. Event records are not deleted from incoming buffer 145 before the node 120, 125 has processed all information relating to a record group, and has written the processed event records to outgoing buffer 145, thus ensuring data integrity in failure situations. In case of multiplied mediation process where one incoming buffer 145 feeds several nodes 120, 125, the first node available for process takes the first available event record group for processing. The system 10 is provided with a locking mechanism to ensure that each event record is processed by one of the multiplied nodes 120, 125 only. When a node 120, 125 takes an event record group for processing, the node 120, 125 marks (locks) the event record group with "under processing" status. Hence, the other nodes 120, 125 know that the particular group is reserved for another node 120, 125 and they can take the next one from the buffer 145 for processing. As already described above, the processing node 120, 125 removes the copies of the event records in a group from the incoming buffer 145 only after processing and successfully writing the processed event records into the outgoing buffer 145. Thus, no data is lost in case the processing node 120, 125 shuts down in an uncontrolled way due to failure of the node or external system, and the lock of the input event record group is automatically released by the underlying UNIX operating system, for instance. When the node 120, 125 recovers, it removes any incomplete record groups in output buffer(s) 145 and restarts processing from the start of the input record group. In case of multiple nodes 120, 125 reading from the same input buffer 145, another node 120, 125 will take care of processing the interrupted input record group as soon as it is unlocked.

Buffers 145 also guarantee that in case the system or a part of it breaks down, the whole mediation process need not be started from the beginning. Instead, the process can continue from the point wherein the break-down happened. The system keeps an audit trail of records read and written by each node to ascertain that no records are lost or duplicated, even if failure occurs.

An embodiment of the invention utilizes shared memory transport in online charging, rating, balance management and account update functionalities 16. The shared memory transport is useful in online mediation environment 12 where the service usage message is processed at once and online e.g. within the active session. This kind of request-response functionality requires extremely low latency in order to function properly. The normal buffering techniques, i.e. file based buffering, are not fast enough for online mediation. It would be possible to do without the buffers but as described above, there are considerable advantages attainable by means of a buffering mechanism. Therefore in an embodiment, the service usage messages are transported between the execute functions (nodes 120, 125, node applications 140) by memory-based buffers 145, also called shared memory transport, or by a useful and fast enough protocol e.g. TCP.

Further in an embodiment of the invention, off-line data 14 is processed as one-way stream 214 from network elements 30 through the process of convergent mediation system 10 to different OSS/BSS elements 20. Typically there is a huge amount of off-line data to be processed. Further, a unit of off-line data is typically much bigger than a unit of online data. At the same time, online data should be processed as quickly as possible. This is required by the nature of online use (prepaid). Typically, the prepaid account has to be checked and credited before the service is given to the subscriber. This functionality is also called pre-delivery control. The pre-delivery control prevents all kind of fraudulent use. It should be noted that the online stream 212 also generates data for off-line processing 14 in some cases, for example information for billing. This does not affect the actual online processing 12 i.e. the request-response mechanism.

Furthermore in an embodiment of the invention, the one platform technology 18 provides a stream loopback functionality. This functionality enables visualizing and configuring the online mediation stream 212 in the convergent mediation system 10. In an embodiment of the invention, a node 125 implements both collector and distributor functionalities to enable the request-response type synchronous collection or front-end interfaces.

Some useful functionalities of the convergent mediation system 10 are presented below.

Node Functionality

According to an embodiment, the architecture uses interactive nodes 125 to manage the processes of online mediation 12. These nodes 125 are called interface nodes 125. Further, the interface nodes 125 have the responsibility of carrying out the request-response actions, they are connected to network elements 30 or devices near network elements 30 or devices responsible of proxying or controlling the actual communication.

In some embodiments, the node functionality is made by e.g. C, Perl or Java languages. The embodiment fits for normal hardware platforms such like SunOS, LINUXintel, HP-UX, AIX and Itanium.

In another embodiment of the invention, a shared memory transport is used. The transfer of records between nodes 120, 125 can also be through files in a buffer directory 145. Each file contains a number of records which are processed within a transaction. When transaction is at end, the node 120, 125 flushes files and commits. Creating, opening, flushing and scanning for files is slow, so the bigger the input files are, the better the node's throughput is. Latency is, however, bad when using file based buffer mechanism 145.

To greatly improve the latency, the records are passed between nodes 120, 125 in a more efficient way than files. Most efficient buffer mechanism 145 for inter-process communication is shared memory, so an embodiment uses shared memory as a record buffer container 145.

According to an embodiment, a buffer 145 includes a record queue, data area and memory allocator data. When a writer writes a record into the buffer 145, it allocates memory from the data area, stores the prepared record into the allocated data block and inserts information about the record into the record queue. The reader processes the records from the queue in order. When the writer runs out of data area memory, it will free old, processed records from the queue and data area. The data areas may be arranged such that each buffer 145 has a single reader and writer. To enable scalability, each reader and writer can access multiple buffers 145.

An embodiment of the invention allows threads and locking mechanism. To enable low latency processing of records, the writer and reader nodes must be synchronized. According to an embodiment, this problem is solved as follows: the writer node holds a lock in the record queue for the next record it is going to write. The reader always tries to acquire a lock from the queue—if it can acquire a lock, it either means that a record is available for processing or that the writer node is dead since no lock is being held. If the writer is dead, reader will sleep until a writer becomes available. Due to the locks used through the shared memory, the reader process is woken up immediately when the writer has finished writing a record.

In embodiments wherein the readers are able to read from multiple input buffers 145 and so try to acquire a lock from multiple buffers simultaneously, a multithreading support is added to Node Base 130. Each input buffer 145 has its own reader thread which will signal the main Node Base 130 thread when there are records to be processed.

Performance of the Embodiment

The performance of the shared memory transport has been tested for several types of nodes such like C, Perl and Java based nodes. Some performance tests were executed to find out the throughput and latency of the architecture 18. Two streams were tested, one with separated decoders and encoders, one with a single business logic node. Note that no actual encoding/decoding is done, the collector simply generates records and sends them through the stream and calculates the time it took for the record to come back.

In both streams, the interface node initiates the test by generating 2 records for the Stream A and 5 records for the Stream B. Those records will then cycle through the stream—when the record arrives back to the interface node, the node will write a new record. In effect there is a total of 2 or 5 records in the stream being processed at all times. Adding more records causes queues which does not improve performance but does increase latency.

Results

The streams were run for a short while, and performance was measured. Average latency for a batch of 1000-5000 records, the number of records per CPU second used for the interface and the business logic nodes, and the whole stream throughput in records per real-time second.

In order to measure the latency, the interface node inserts the current time into the record before writing it out, and when the record arrives back into the interface node, it reads the timestamp from the record and compares it to the current time.

| Stream | Interface CDRs/CPU second | Business Logic CDRs/CPU second | Throughput CDRs/second | Latency |
|---|---|---|---|---|
| Test host 1 | | | | |
| Stream A | 11000 | 13000 | 11000 | 0.16 ms |
| Stream B | 10000 | 12000 | 9000 | 0.55 ms |
| Test host 2 | | | | |
| Stream A | 20000 | 21000 | 20000 | 0.09 ms |
| Stream B | 17000 | 20000 | 16000 | 0.30 ms |
| Test host 3 | | | | |
| Stream A | 42000 | 43000 | 36000 | 0.05 ms |
| Stream B | 28000 | 30000 | 20000 | 0.23 ms |

According to an embodiment of the invention, the scalability of the shared memory transport implementation can be used with multiple IN/OUT streams between the nodes 120, 125 to enable faster response times per transaction and higher throughput in overall. Also nodes 120, 125 are able to start in any order if some of the nodes have been stopped or crashed. A recovery for shared memory buffer 145 can be done when a node has crashed. Further, inspecting buffers 145 from command line, flushing buffers 145 to files makes the operability of the mediation system easier. Node Base 130 supports also multithreading. This means that Node Base 130 allow reader threads to process the records themselves instead of synchronizing with a "main" thread. Furthermore, a configuration of the shared memory mode through user interface and XML is possible. By these means it is possible to enable/disable per link, configure buffer size, inform fault detection, etc. The fault detection notices when any node in the stream fails, pausing the processing and resuming when stream is back in working order.

Figure 18:
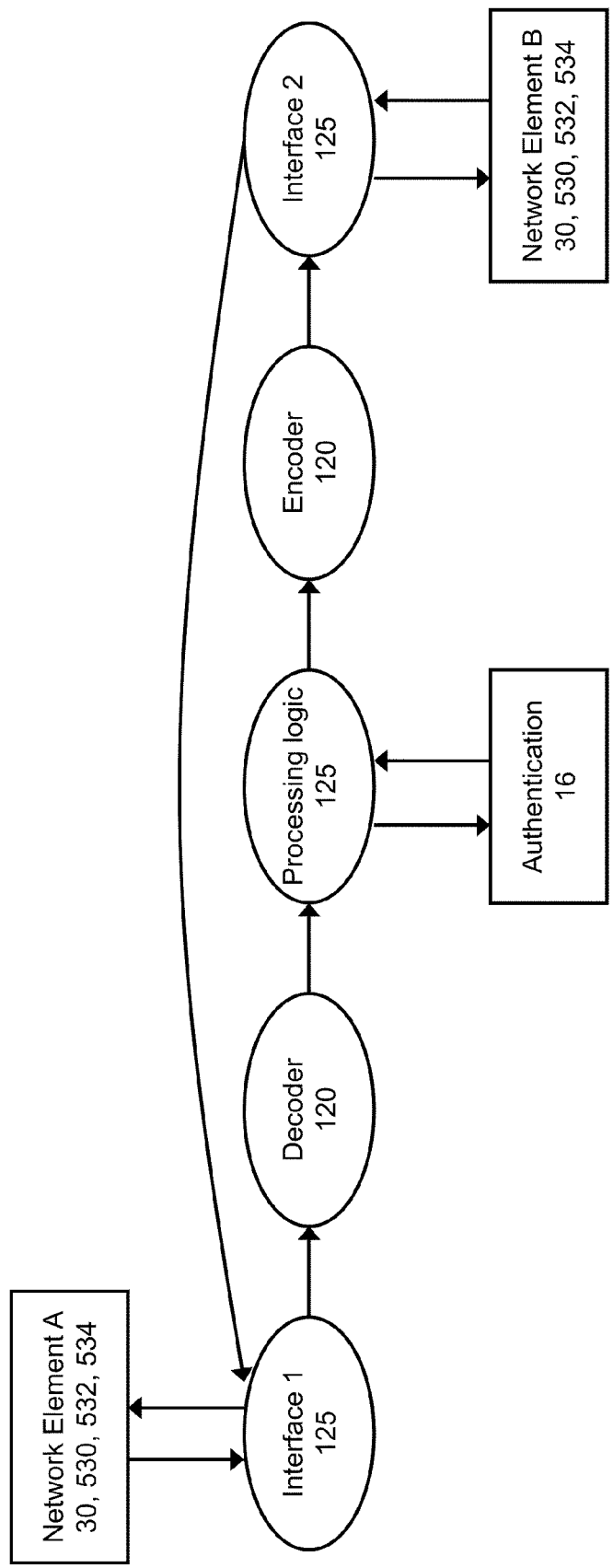
FIG. 18 presents a block diagram of a convergent mediation system according to an embodiment including online interface nodes.

An embodiment of the invention enables a functionality of stream loopback. To be able to visualize and configure the online mediation stream 212 there is provided a node 125 that can act as a Collector and Distributor to enable request/response type synchronous communication between the Network Elements 30 and the online collection/front-end interfaces 20. The loopback feature is implemented by defining an interface node 125. The interface node 125 contains both a collector and a business logic node and further it can read records from input buffer 145, but it also can efficiently read and send records to an outside system. This allows a creation of streams 200 that have multiple interfaces 40 to outside systems 20, 30. This is also presented in FIG. 18.

The following example describes one kind of minimal online mediation type of stream 212 build on top of the one platform architecture 18. This example shows one possible implementation to build a stream 212 using node architecture that is capable of providing high enough performance and low latency that is required for the convergent mediation system 10. In the example, there are three components involved: client application, online stream and AAA functionality.

The node application 140 creates a Diameter credit control like traffic for multiple sessions. Each session is started with ccr-init request. It is followed by ten ccr-update request. The sessions are ended with ccr-final request. This makes a total of 12 messages for each session. The average packet size is 200 bytes. One client establishes one physical connection to stream. The window size is 10; there is a maximum of 10 messages in processing concurrently.

Online Stream 212 implements microbalancing credit control application 16. When it receives a ccr-init request for a session, it will request new quota from accounting system (AAA functionality) and store the reserved quota to session cache (non-persistent). Each ccr-update request decrement the quota in the session cache. The cc-final request will return the unused quota to accounting system.

AAA functionality is a Java echo server application. It simulates accounting systems 20 quota reservation and return by echoing back the ccr-init and ccr-final packets received from the stream 212.

An embodiment of the invention executes separate thread and when there is something to process the node base 130 is notified. This could be a service provided by the node base 130, e.g. we could have a callback defined where node 120, 125 developer may include a blocking operation. When callback function returns the node base will invoke the process( )method with the main thread.

High Availability

An embodiment of the invention has a high availability feature, which is shown in this setup as two interface nodes 125 installed on two hosts. For example two hosts can be physically located far away from each other for disaster control. Network elements 30 are connected to both hosts. The nodes 125 are in active-active mode, meaning that both nodes receive traffic all the time. The traffic is distributed based on the subscriber IMSI, therefore the traffic of one IMSI should always go to the same node. However, in case of interface node failure (NE detects these as described in diameter documentation), all the traffic will be routed to other, surviving node. The traffic will be routed back once the crashed node is up and running. The business support system 20 has two interfaces; primary and secondary. Secondary is only used if primary is down (detected as described in diameter documentation).

The business logic does micro balancing and the flow for one IMSI user session is roughly following:
   Flow receives initial credit control request from network element
   Flow makes a quota reservation from BSS and stores the quota to "local" cache
   Flow receives intermediate credit control request from network element
   Flow decrements quota in the "local" cache
   Flow receives intermediate credit control request from network element
   Flow notices that there is not enough quota in local cache, therefore it does additional reservation to BSS and stores new quota amount to "local" cache
   Flow receives final credit control request from network element
   Reserved BSS is notified and unused quota in local cache is returned to BSS Additionally, there is at least one delivery where the interface node generates mid-call charging events to the business logic flow:
   Flow receives initial credit control request from network element
   Flow creates a new session control job based on the user IMSI and schedules it to session control
   After defined period flow receives notification from session control coupled with the user IMSI. Flow then does the business logic defined for the mid-call charging events.
   Flow receives the final credit control request
   The IMSI is unsubscribed from the session control An embodiment of the invention presents the following setup examples. Two interface nodes 125 share the local cache for micro balancing (e.g. the user session state identified by the IMSI is known by both nodes). If the other interface node 125 crashes, the other one is able to function independently. When the failed node is back on-line, the system is able to start operating normally. The system updates are possible so that the service level is not affected. Interface nodes can be updated independently. If a shared resource, such as a local cache (in-memory database) or session control (ordinary database), requires an update, the system update is done without affecting service level. One solution would be to add new interface nodes 125 that use the new shared resource. The new traffic (e.g. new user sessions) is routed to new updated nodes. The old nodes are not removed from the system until the old traffic has been handled.

A further embodiment of the invention provides the following session control issues. Session control is basically a persistent and clustered scheduler. It has the following requirements. The scheduled event is executed only once in the cluster (e.g. if you scheduled a job that should be invoked every minute, it is invoked once per minute in one node only). Scheduler makes sure that all the events get executed even if they were a bit late. However, there is configurable misfire threshold that defines how old missed jobs are still triggered. Jobs rejected due to misfire threshold raise an alarm. Scheduler supports one time only and recurring tasks. The scheduler supports rescheduling if there is a temporary error e.g. in resources. When there is a temporary error in one of the nodes, the scheduler should route the jobs to currently working node and execute scheduled and re-scheduled tasks there until the failing node has recovered from the errors.

Figure 19:
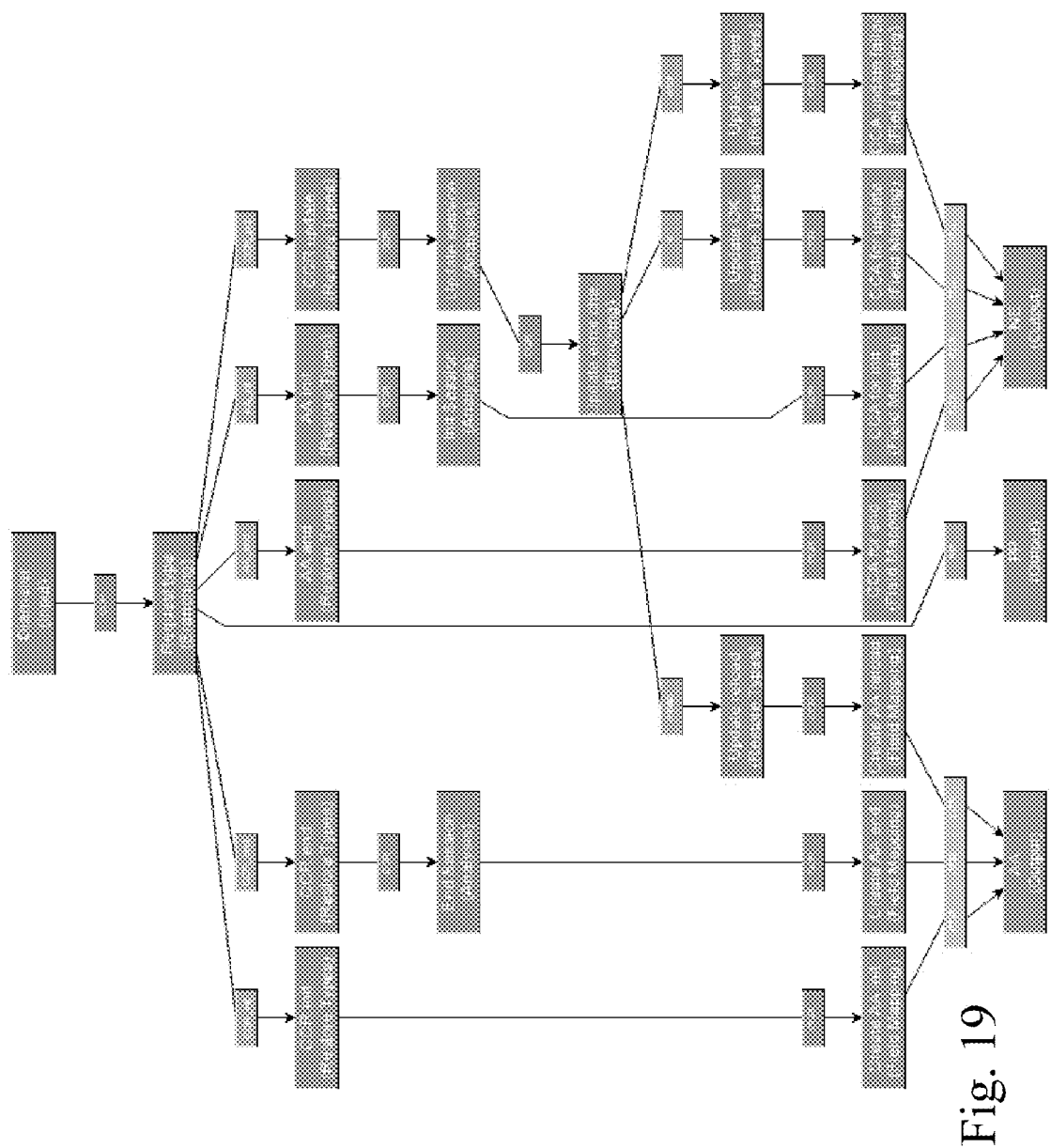
FIG. 19 presents a flow diagram of an example of visualizing decision points and session cache used in a convergent mediation system according to an embodiment of the invention.
Figure 20:
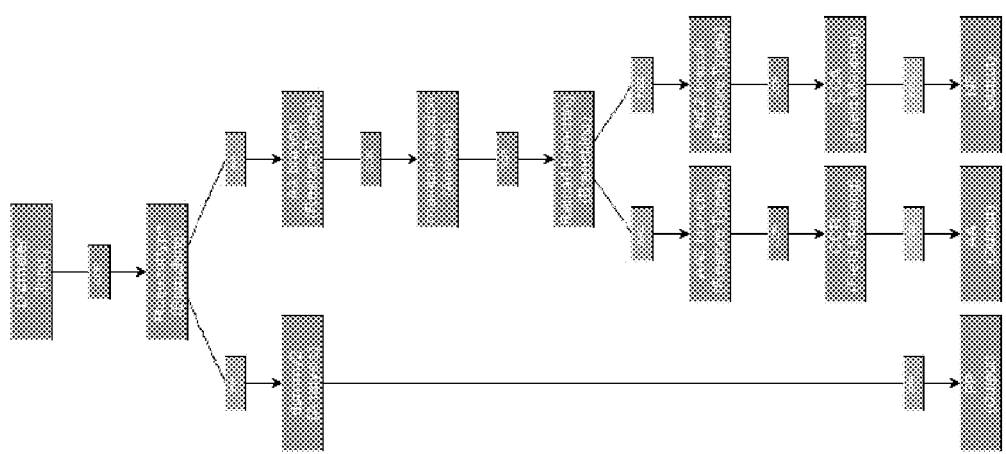
FIG. 20 presents another flow diagram of the example of FIG. 19 of visualizing a data flow used in a convergent mediation system according to an embodiment of the invention.

An embodiment provides a visual picture for the operator as to how the logic is implemented. Using lot of branching makes the logic more like process flow FIGS. 19 and 20 represent logics that have exactly the same functionality. FIG. 19 is implemented so that it exposes the process flow; decision points and session cache usage as much as possible. FIG. 20 is done more in a data flow manner in which the highest level picture doesn't tell much about the flow, and decision points and session cache usage are hidden in the analysis elements.

Adding new custom functionalities to the embodiment with visual appearance can be extended with function libraries. These libraries are for example c/c++ implementations which introduce functions with visual appearance specific signature. Signature is very generic and doesn't limit the number of parameter nor returned values, but it only supports string and integer type of parameters.

Function library contains user interface definitions including input and output parameter introduced for each function. Based on these definitions, user interface lets the user to select record field values or node parameters and input parameters and set temporary field or global variable to which return values are stored.

The above description is only to exemplify the invention and is not intended to limit the scope of protection offered by the claims. The claims are also intended to cover the equivalents thereof and not to be construed literally.

The invention claimed is:

1. A convergent mediation system comprising:
  processing streams including an online processing stream for the online processing of data and an off-line processing stream for the off-line processing of the data, each of the processing streams comprising independent nodes structured to continue operating if an independent node in a processing stream fails, wherein at least the first independent node in the online processing stream is an online interface node adapted to receive the data from at least one of a communications network and a service delivery platform and send a response thereto;
  each of the processing streams comprising at least two of the independent nodes in sequence and a buffer between every two of the at least two independent nodes, wherein a buffer downstream of an independent node keeps a copy of an item of data until a corresponding item of data is successfully written in a buffer upstream of the independent node, and
  at least one of the buffers in the online processing streams including a dedicated memory area in a random access memory.

2. The system of claim 1, further comprising an internode transport layer including the buffers between the sequential nodes.

3. The system of claim 2, wherein the internode transport layer comprises a plurality of buffers selected from the group of socket, shared random access memory and disk memory.

4. The system according to claim 1, wherein each of the independent nodes comprises a node application and a node base.

5. The system of claim 4, wherein the node application contains logical rules according to which the independent node processes the data.

6. The system of claim 4, wherein the node base is adapted to provide basic functionalities for the processing node.

7. The system of claim 6, wherein the basic functionalities include an interface to the internode transport layer allowing the processing node to read data from at least one of the buffers and write data in at least one of the buffers.

8. The system of claim 6, wherein the basic functionalities include external interfaces of the processing node and an interface to the node application.

9. The system according to claim 4, wherein the node bases of the independent nodes are identical to each other.

10. The system according to claim 4, wherein the node applications and the internode transport layer are independent from each other.

11. The system according to claim 2, adapted to process an item of data under processing in a processing stream such that the internode transport layer keeps a copy of the item of data in a preceding buffer until a corresponding item of data has been successfully written in a succeeding buffer in the processing stream.

12. The system according to claim 1, wherein at least one online processing stream includes at least three independent nodes in sequence and buffers between each of the sequential three independent nodes, wherein the buffers are formed by dedicated memory areas in at least one random access memory.

13. The system according to claim 1, wherein the convergent mediation system is adapted to selectively form the content of the response.

14. The system according to claim 1, adapted to remove any data from the buffer only after successfully performing the processing operation in the succeeding processing node in the processing stream.

15. The system of claim 14, wherein in case of a processing node shut-down, the system is adapted to replace the shut-down node in the processing stream with a new processing node, which starts to process the data in the preceding buffer, whereby no data is lost in the processing node shut-down.

16. The system according to claim 1, further comprising a system controller structured to dynamically start up and shut down the online processing streams and the off-line processing streams.

17. A convergent mediation method comprising:
  providing processing streams including at least two independent nodes in sequence and a buffer between every two of the independent nodes, the independent nodes structured to continue operating if an independent node in a processing stream fails, the processing streams including at least one off-line processing stream and at least one online processing stream, the buffer in the at least one online processing stream being formed by a dedicated memory area in a random access memory, wherein at least the first independent node in the at least one online processing stream is an online interface node;
  with the online interface node, obtaining data from at least one of a communications network and a service delivery platform and sending a response thereto; and
  processing the obtained data in the at least one of the off-line and online processing streams, wherein the data processing in the online processing stream includes passing an item of data from a preceding node in the steam to a succeeding node in the steam via said buffer formed by the dedicated memory area in the random access memory, and wherein said buffer keeps a copy of said item of data until a corresponding item of data is successfully written in another buffer upstream of the succeeding node.

18. The method of claim 17, wherein the provided independent nodes each comprise a mutually identical software component, a node base, which provides basic functionalities for the node.

19. The method of claim 17, wherein the obtained data comprises a service request, and the processing of the service request comprises
  performing an access control operation on the basis of the service request, and
  based on the performed access control operation, responding to the at least one of the communications network and the service delivery platform either positively or negatively,
  wherein a negative response prevents the at least one of the communications network and the service delivery platform from allowing the service request and a positive response allows it to continue with fulfilment of the service request.

20. The method according to claim 17, further comprising providing at least one off-line processing stream comprising at least three independent nodes in sequence and a buffer between each of the sequential nodes, and providing at least one online processing stream comprising at least three independent nodes in sequence and a buffer between each of the sequential nodes, each of the buffers in the online processing stream being formed by a dedicated memory area in a random access memory.

21. The method according to claim 17, wherein processing of an item of data in a processing stream includes keeping a copy of the item of data in a preceding buffer until a corresponding item of data has been successfully written in a succeeding buffer in the processing stream.

22. A non-transitory computer readable storage medium on which is embedded at least one computer program, said at least one computer program implementing a convergent mediation method and comprising a set of instructions for:
providing processing streams including at least two independent nodes in sequence and a buffer between every two of the independent nodes, the independent nodes structured to continue operating if an independent node in a processing stream fails, the processing streams including at least one off-line processing stream and at least one online processing stream, the buffer in the at least one online processing stream being formed by a dedicated memory area in a random access memory, wherein at least the first independent node in the at least one online processing stream is an online interface node;
with the online interface node, obtaining data from at least one of a communications network and a service delivery platform and sending a response thereto; and
processing the obtained data in the at least one of the off-line and online processing streams, wherein the data processing in the online processing stream includes passing an item of data from a preceding node in the steam to a succeeding node in the steam via said buffer formed by the dedicated memory area in the random access memory, and wherein said buffer keeps a copy of said item of data until a corresponding item of data is successfully written in another buffer upstream of the succeeding node.

23. The system of claim 1, wherein the online interface node is configured to identify a type of processing required by the data and to forward the data to one of an online processing stream and an offline processing stream selected, based on the type of processing required by the data, from the processing streams for the online processing and the off-line processing of the data.

* * * * *